(12) United States Patent
Kashihara

(10) Patent No.: US 6,271,868 B1
(45) Date of Patent: *Aug. 7, 2001

(54) MULTIPLE-COLOR IMAGE OUTPUT APPARATUS AND METHOD WHICH PREVENTS A TONER IMAGE ON A PHOTOSENSITIVE DRUM FROM BEING NARROWED IN THE HORIZONTAL DIRECTION

(75) Inventor: Atsushi Kashihara, Hachioji (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,815

(22) Filed: Mar. 11, 1997

(30) Foreign Application Priority Data

Mar. 11, 1996 (JP) .................................... 8-053395

(51) Int. Cl.⁷ ................. B41J 2/385; B41J 2/47
(52) U.S. Cl. ................ 347/115; 347/251; 347/252; 347/253; 347/254
(58) Field of Search .................. 347/115, 131, 347/133, 251, 252, 253, 254; 399/181; 358/443, 444, 447, 454, 456, 453, 457, 462, 300, 298; 395/110, 115, 151; 382/192, 193, 194

(56) References Cited

U.S. PATENT DOCUMENTS

| | | | |
|---|---|---|---|
| 5,252,995 | * 10/1993 | Trask et al. | 358/518 |
| 5,438,437 | * 8/1995 | Mizoguchi et al. | 358/518 |
| 5,581,358 | * 12/1996 | Seto et al. | 347/131 |
| 5,652,660 | * 7/1997 | Seto et al. | 347/131 |

FOREIGN PATENT DOCUMENTS

| | | | |
|---|---|---|---|
| 0422602 | 4/1991 | (EP) | H04N/1/46 |
| 0633688 | 1/1995 | (EP) | H04N/1/40 |

* cited by examiner

Primary Examiner—Thinh Nguyen
(74) Attorney, Agent, or Firm—Fitzpatrick, Cella, Harper & Scinto

(57) ABSTRACT

When a multiple-color image is printed by electrophotography unwanted spaces are produces between different colors. These spaces are attributed to non-development of toner caused by the influence of an electric field at the boundary of an electrostatic latent image formed on a photosensitive drum. Accordingly, when data conversion is converted from two-bit data of a bitmap to eight-bit data that are used for modulating a light signal, a pixel of interest and the neighboring 9×9 pixels are stored and the state thereof is determined. If the pixel of interest is a white pixel and the neighboring pixels are all non-white pixels, then the pixel of interest is not left at a value corresponding to white, but is converted to a value corresponding to a potential that will not develop toner. The photosensitive drum is irradiated with a laser based upon the data resulting from the conversion. Thus, a sudden conversion from a potential corresponding to white to a potential corresponding to the maximum density is eliminated at the outline of the image. This makes it possible to prevent the influence of an electric field at the edge of the image and, hence, to prevent the occurrence of unwanted spaces between colors.

44 Claims, 18 Drawing Sheets

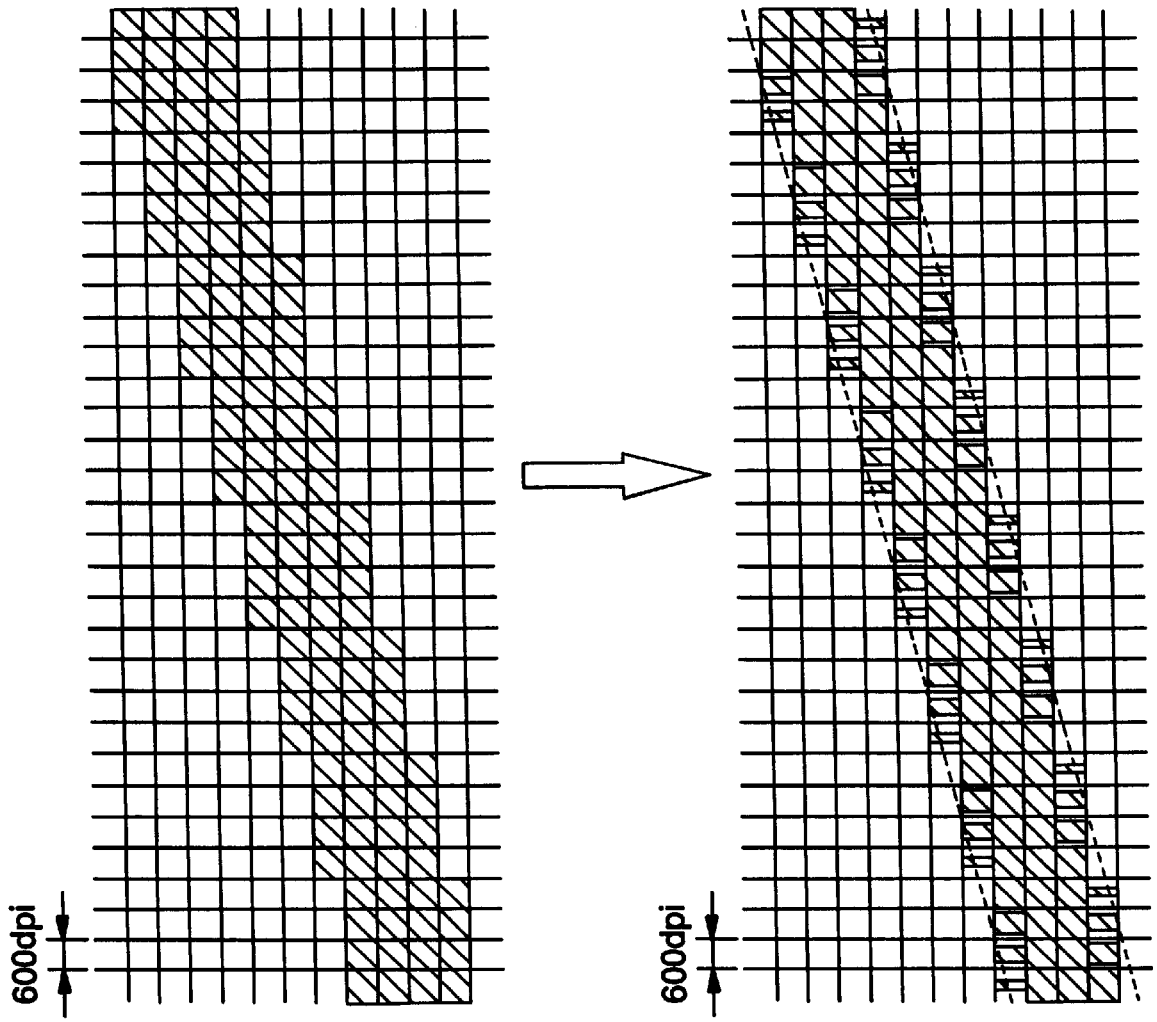
FIG. 13A → FIG. 13B

MULTIPLE-COLOR IMAGE OUTPUT APPARATUS AND METHOD WHICH PREVENTS A TONER IMAGE ON A PHOTOSENSITIVE DRUM FROM BEING NARROWED IN THE HORIZONTAL DIRECTION

BACKGROUND OF THE INVENTION

1. Field of the Invention

This invention relates to a multiple-color image output apparatus such as a color laser-beam printer, as well as to a multiple-color image output method.

2. Description of the Related Art

Image output apparatuses using electrophotography, such as laser-beam printers, have come to be widely used as output apparatus for computers. These image output apparatuses have been a primary factor in the rapid growth of the desktop publishing field owing to such features as high printing quality, quiet operation and high speed.

Furthermore, a recent trend has been to improve image quality by incorporating such quality-improving techniques as smoothing processing for detecting and smoothing the edges of characters and figures. Printer engines, which serve as the printing mechanisms in printers and have a high resolution of 600 dpi or better, have appeared in place of 240-dpi engines that used to be the standard. By combining the above-mentioned smoothing processing techniques with this higher resolution, these devices provide much better printing quality.

Electrophotographic color printers have also been eveloped. Owing to the improved performance of host computers and controllers for generating the images in printers, color images can be accommodated and printed in addition to conventional monochromatic images. Such color printers have been put to practical use and are becoming increasingly popular. Methods of printing full-color images exhibiting tonality by such color printers include the dither method, density pattern method and error-diffusion method. All of these methods are so-called pseudo-halftone methods which express tones based upon the ratio between printed dots and unprinted dots in a prescribed area. Furthermore, in laser-beam printers in particular, a characterizing feature is that resolution in the main-scan (horizontal scanning) direction can be changed with comparative ease. For example, such printers employ pulse-width modulation which expresses density by varying the driving pulse width of a laser diode in dependence upon the level of image data. This pulse-width modulation technique is superior to pseudo-halftone techniques, which are typified by the dither method, in that it affords both excellent tonality and high resolution.

A method of forming a color image in such a color-image output apparatus includes repeating, a plurality of times, a process through which a recorded image formed on an image bearing body by corona discharge, exposure and development is transferred to recording paper. This provides a color image by forming images of a plurality of overlapping colors on the recording paper. This method is implemented by an arrangement described in the specification of Japanese Laid-Open Patent Application No. 50-50935.

A photosensitive drum is used as the image bearing body in electrophotography. An electrostatic latent image that has been formed on the photosensitive drum is developed by affixing toner to the image. One example of a developing method is a single-component method that makes it possible to employ a process cartridge scheme which does not require complex elements such as an ATR or screw and which facilitates user maintenance. Non-contact development, which is one of the single-component development techniques, is particularly advantageous owing to the simple arrangement involved. Specifically, with contact development, the developing roller and the photosensitive drum contact each other, meaning that one of them must be a resilient body. With the non-contact development method, however, rigid bodies such as aluminum substrates, for example, can be used for these members. This is advantageous in terms of cost.

Further, for each color, it is preferable to use toner which melts instantly at a fixing temperature and is mixed with other color toner for better expression of colors of an output image. However, such toner has a characteristic of low temperature of glass transition in general. When such toner is utilized in the contact development method, the toner is possibly fused and fixed to the photosensitive drum and/or the development roller. To prevent toner from being fused and fixed to the photosensitive drum and/or the development roller, the non-contact method is preferable in electrophotography.

Though the non-contact development method has many advantages, the inventors have found that when a color image in which different colors neighbor each other in the manner shown in FIG. 17A is formed using this method, white gaps or spaces that should not be present appear between the neighboring colors in the image formed, as depicted in FIG. 17B. The reason for this phenomenon is that when a latent image which has been formed on the photosensitive drum and exhibits a sudden change in drum surface potential, as is the case with the image of an edge, is developed by the developing unit, there are occasions where the toner image is formed more narrowly than the electrostatic latent image originally formed on the photosensitive drum. In the case of monochromatic image formation, there are no neighboring colors and, hence, no problems arise even if there is some narrowing of the toner image. However, when a color image is formed under these conditions, as when an image having neighboring bands of cyan and black is formed, as shown in FIG. 17B, unwanted spaces appear between the neighboring cyan and black bands.

This narrowing of the toner image is a phenomenon that occurs because an electric field becomes involved, as shown in FIG. 18, at the edges of the electrostatic latent image formed on the photosensitive drum. The influence of this phenomenon on the image becomes pronounced in non-contact development. A method available to mitigate this phenomenon involving the electric field entails lowering the charging potential when the surface of the drum is uniformly charged. Though this method has the effect of reducing the narrowing of the toner image, a so-called fogging phenomenon, in which toner becomes affixed to the non-print areas, occurs, and the potential difference between print and non-print areas diminishes. The result is that a satisfactory image density cannot be obtained.

SUMMARY OF THE INVENTION

Accordingly, an object of the present invention is to provide a multiple-color image output apparatus and method in which narrowing of the toner image on a photosensitive drum in non-contact development is prevented so that it is possible to avoid the occurrence of spaces produced between different colors when color printing is carried out.

Another object of the present invention is to provide a multiple-color image output apparatus and method in which an image having an outline smoother than that provided by the original resolution can be printed by smoothing the edges of the image.

According to the present invention, the foregoing objects are attained by providing a multiple-color image output apparatus for forming a color image by successively superimposing images of a plurality of color elements on a transfer member, the apparatus comprising image generating means (206) for generating a bitmap image of each color, an image bearing body (108) having a surface on which a latent image is formed by an electric potential distribution, latent-image forming means (14) for referring to a pixel of interest in the bitmap image and a group of pixels neighboring the pixel of interest and, if the pixel of interest is a white pixel and the group of pixels neighboring the pixel of interest includes a non-white pixel, forming a latent image corresponding to the pixel of interest on the image bearing body at a potential for which there is a prescribed difference relative to the potential corresponding to the white pixel and at which the latent image will not be rendered visible, and developing means (100) for developing the latent image on the image bearing body into a visible image.

Further, according to the present invention, the foregoing objects are attained by providing a multiple-color image output method for forming a color image by forming a latent image on a surface of an image bearing body by distributing an electric potential on this surface and successively superimposing visible developed images, which correspond to the latent image, of a plurality of color elements on a transfer member, the method comprising an image generating step of generating a bitmap image of each color, a latent-image forming step of referring to a pixel of interest in the bitmap image and a group of pixels neighboring the pixel of interest and, if the pixel of interest is a white pixel and the group of pixels neighboring the pixel of interest includes a non-white pixel, forming a latent image corresponding to the pixel of interest on the image bearing body at a potential for which there is a prescribed difference relative to the potential corresponding to the white pixel and at which the latent image will not be rendered visible, and a developing step of developing the latent image on the image bearing body into a visible image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 13A, 13B are diagrams illustrating results of printing the image of an edge portion according to the second embodiment;

DESCRIPTION OF THE PREFERRED EMBODIMENTS

A preferred embodiment for a case where the present invention is applied to a 600-dpi color laser-beam printer will be described in detail with reference to the accompanying drawings.

(First Embodiment)

Figure 1:
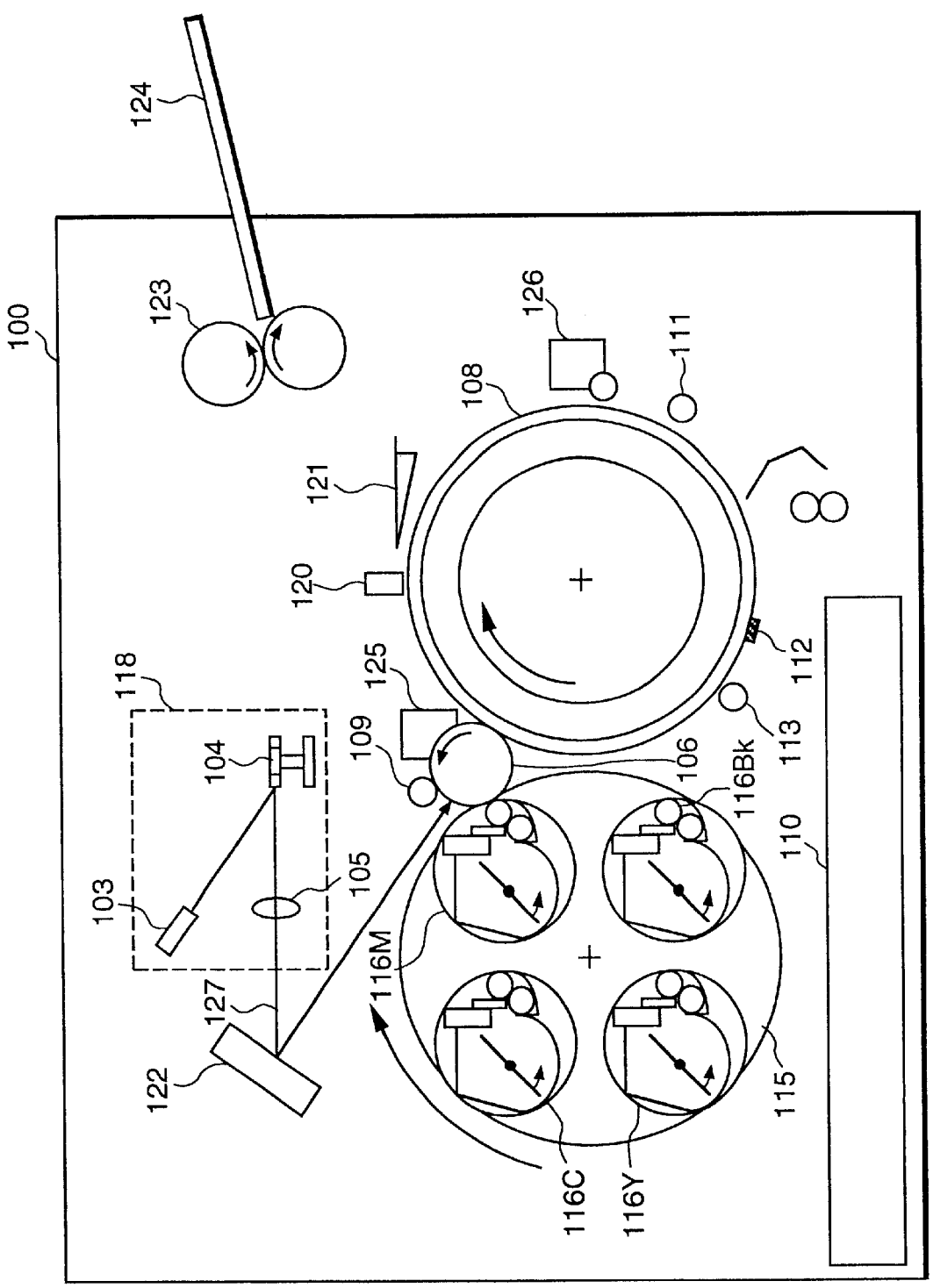
FIG. 1 is a transverse sectional view of a printer engine.

FIG. 1 is a sectional view illustrating the printer engine of a color image output apparatus.

As shown in FIG. 1, the apparatus includes a main body 100 housing a photosensitive drum 106, which serves as an image bearing body, and a roller-type corona discharge device 109. Disposed on the left side of the photosensitive drum 106 are a plurality of developing devices 116M, 116C, 116Y, 116Bk arranged on the circumference of a circle the center of which is the rotary shaft of a rotatable supporting body 115. The developing devices 116M, 116C, 116Y, 116Bk contain magenta toner, cyan toner, yellow toner and black toner, respectively, serving as the developer. Each developing device is driven in such a manner that an opening for developing purposes opposes the surface of the photosensitive drum 106 at all times.

Disposed on the right side of the photosensitive drum 106 is a transfer drum 108 for holding recording paper (not shown) and transferring the image from the photosensitive drum 106 to the recording paper. The arrangement is such that the photosensitive drum 106 is rotated in the direction of the arrow by driving means, not shown.

The corona discharge device 109 is so adapted that an AC voltage having a frequency of 1000 Hz and a peak-to-peak voltage (Vpp) of 1500 V is impressed upon a uniform DC voltage of 700 V so that the surface of the photosensitive drum 106 is evenly charged to a uniform 700 V.

Disposed at the upper part of the main body is an optical unit 118 and a reflecting mirror 122, which construct an exposure device and act as an optical scanning system. The optical unit 118 includes a laser diode 103, a rotating polygon mirror 104 rotated by a high-speed motor, and an image forming lens 105.

Figure 2:
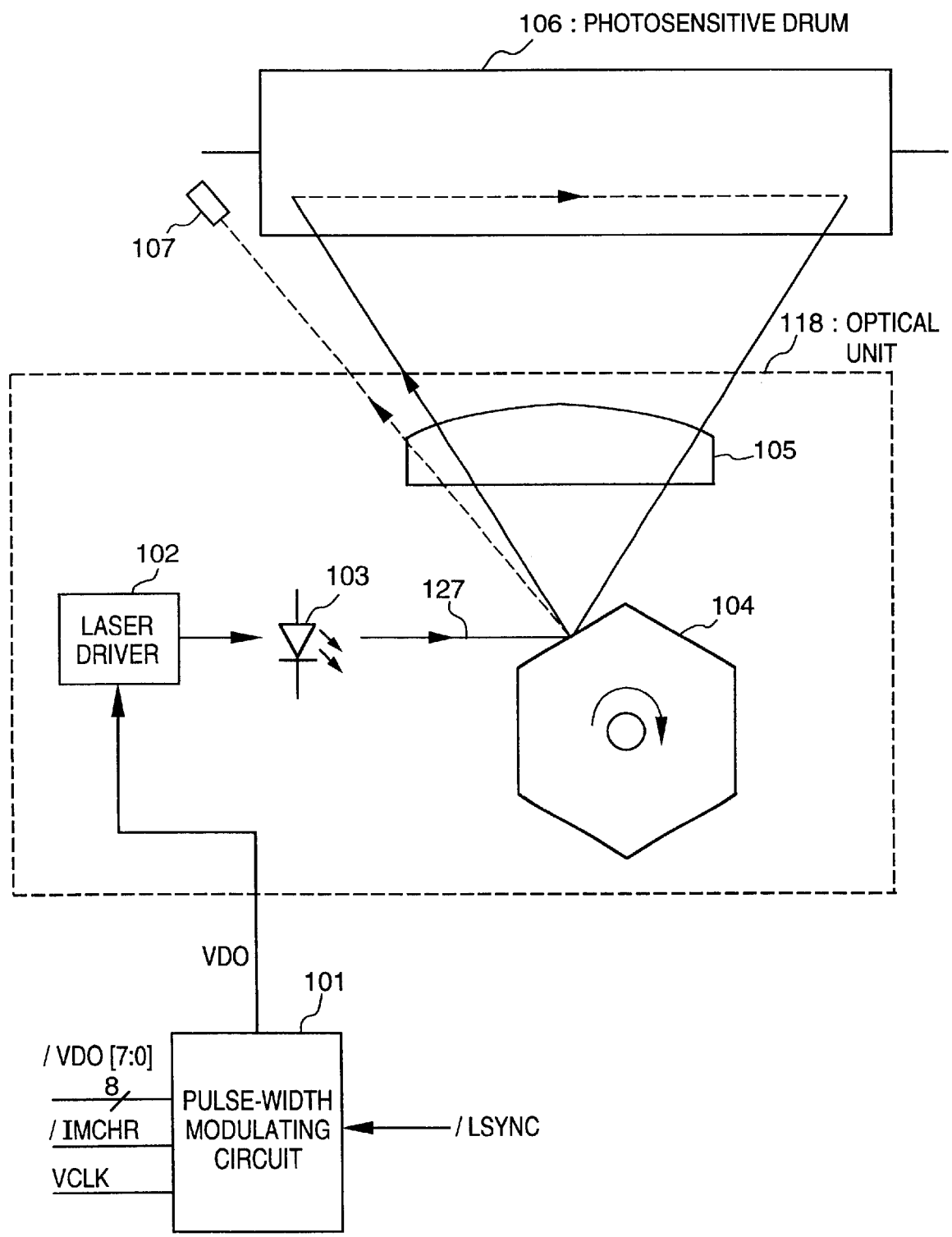
FIG. 2 is a top view showing the scanning system of the printer engine.

FIG. 2 is a top view of the optical scanning system from which the reflecting mirror has been deleted to simplify the drawings.

A 600-dpi, eight-bit multivalued image signal /VDO7~/VDO0 and an image attribute signal /IMCHR enter a pulse-width modulating circuit 101 in sync with an image clock signal VCKL, where the signal modulation is carried out. A laser drive signal VDO having a pulse width conforming to the level of the image signal is produced by the pulse-width modulating circuit 101 and applied to laser driver 102.

Figure 3:
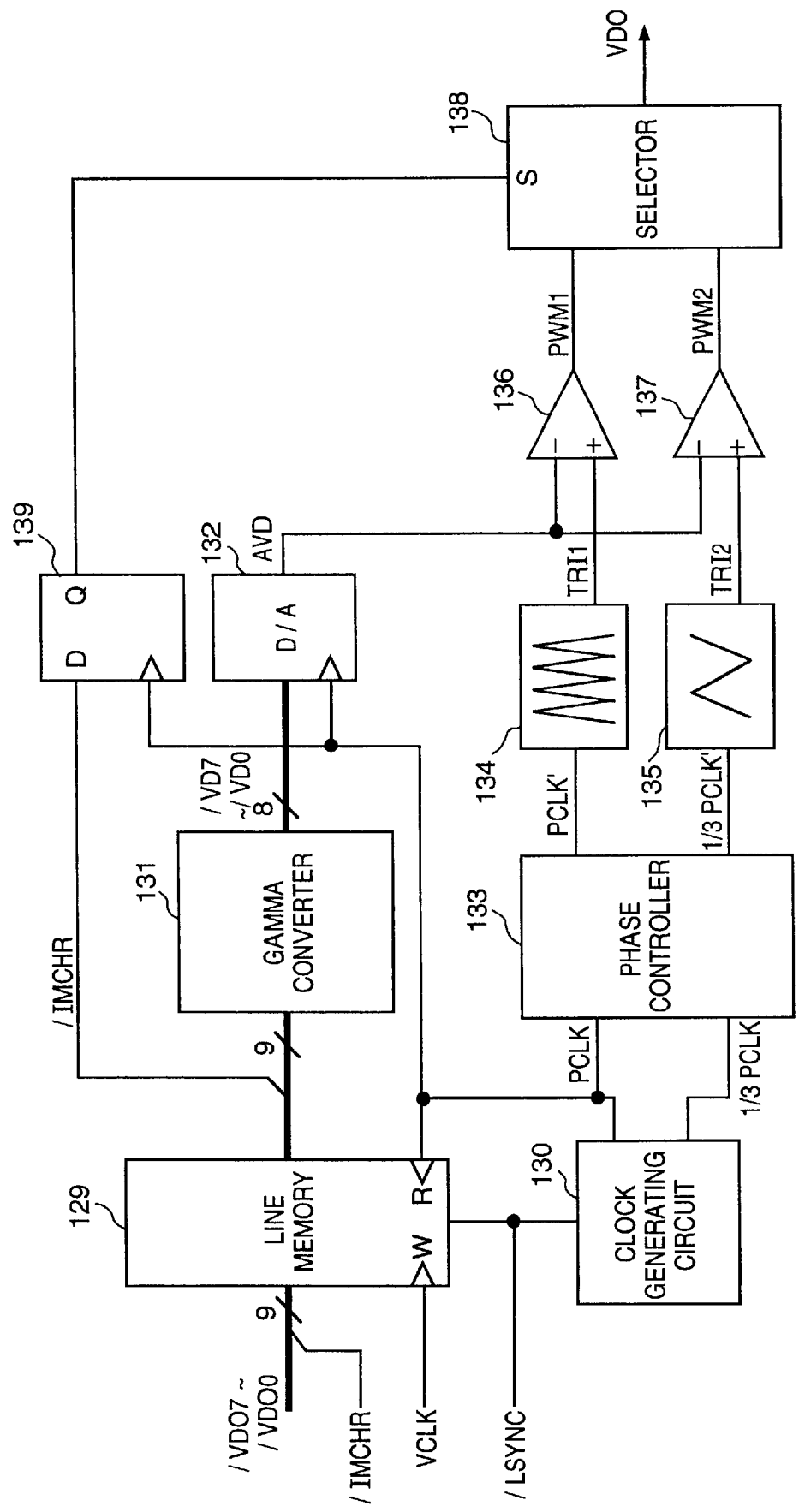
FIG. 3 is a block diagram of a pulse-width modulating circuit.

FIG. 3 is a block diagram showing the internal construction of the pulse-width modulating circuit 101. A line memory 129 is constructed in the form of a toggle buffer and is so designed that reading and writing are performed simultaneously by an independent clock. A clock generating circuit 130 generates a pattern clock signal PCLK synchronized to a horizontal synchronizing signal /LSYNC, and a clock signal ⅓ PCLK, the frequency whereof is one-third that of PCLK. The pattern clock signal PCLK has a period that corresponds to the printing of one dot of 600 dpi. The pulse-width modulating circuit 101 further includes a gamma converter 131, a D/A converter 132, a phase controller 133, triangular wave generators 134, 135, comparators 136, 137, a selector 138 and a D-type flip-flop 139. The operation of the pulse-width modulating circuit 101 will now be described.

One line of the signal /VDO7~/VDO0 and image attribute signal /IMCHR in the main-scan (horizontal scanning) direction is written to the line memory 129 by the clock signal VCLK. When the writing of the first line is completed, the bank of the line buffer 129 in which the data are written is changed over by the horizontal synchronizing signal /LSYNC of the next line, the signal of the second line is written and, at the same time, the already written data of the first line are read out by the pattern clock signal PCLK. The signal /VDO7~/VDO0 and image attribute signal /IMCHR that have been read out enter the gamma convertor 131. The gamma convertor 131 subjects the signal /VDO7~/VDO0 to a gamma conversion best suited to the process conditions of the printer engine in dependence upon the number of lines of pulse-width modulation specified by the /IMCHR signal. The gamma-converted eight-bit image signal /VDO7~/VDO0 is converted to an analog voltage by the D/A converter 132 in conformity with the values of the signal, whereby an analog video signal AVD is obtained. In the conversion operation, the D/A converter 132 generates the minimum voltage when the valve of the image signal /VDO7~/VDO0 is 00H and generates the maximum voltage when the value of the image signal /VDO7~/VDO0 is FFH. The analog video signal AVD enters the negative input terminal of the comparators 136 and 137.

Figure 4:
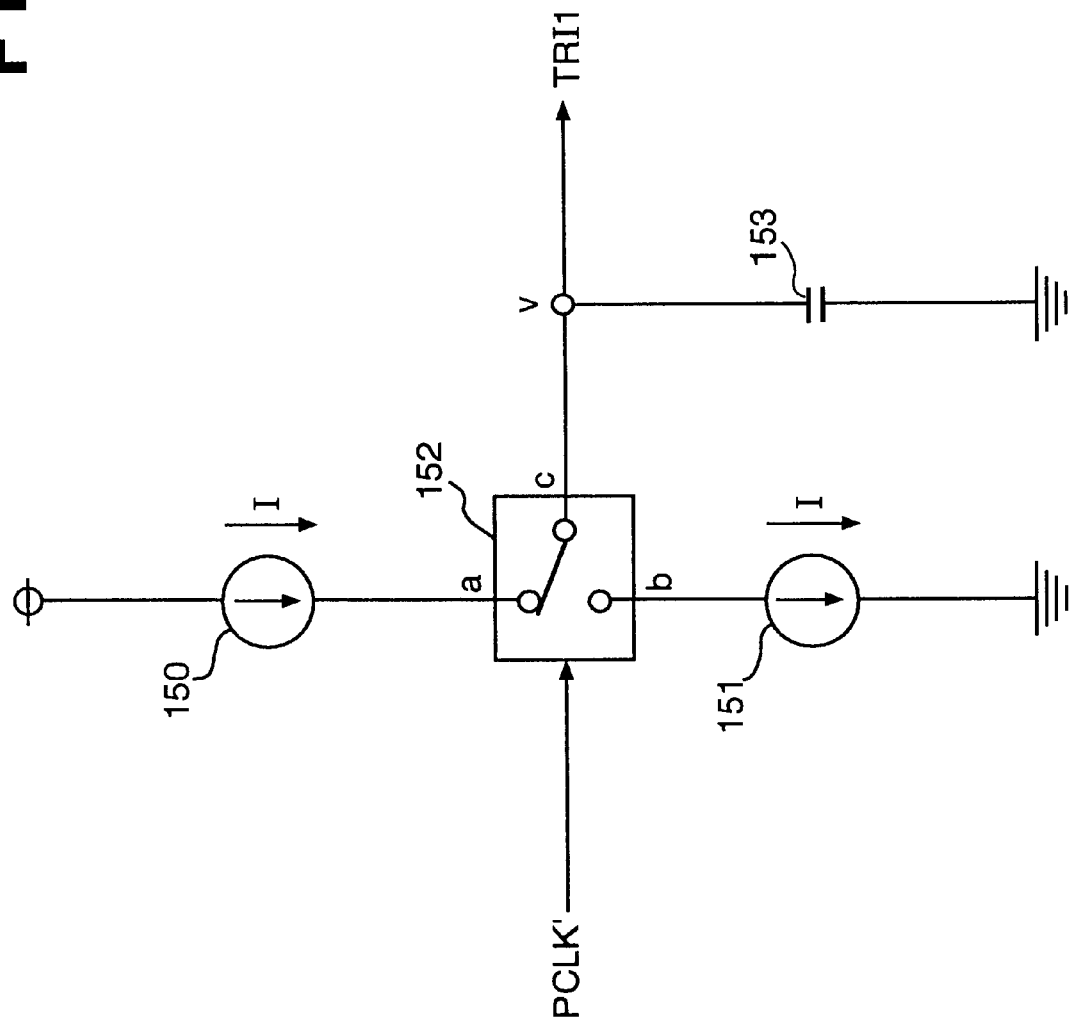
FIG. 4 is a diagram showing the construction of a triangle wave generating circuit.

An output TRI1 from the triangular wave generator 134 and an output TRI2 from the triangular wave generator 135 enter the positive input terminal of the comparators 136 and 137, respectively. The triangular wave generator 134 is constructed as shown in FIG. 4, by way of example. As shown in FIG. 4, the triangular wave generator 134 includes a changeover switch 152 to which a clock signal PCLK', which is the result of phase-shifting the pattern clock signal PCLK by the phase controller 133, is applied as an input signal. When the clock PCLK' is at the H (high) level, the switch 152 connects terminals a and c so that a current I from a current source 150 flows into a capacitor 153. When this occurs, electric charge accumulates in the capacitor 153, thereby increasing a voltage value V in linear fashion.

When the clock PCLK' then assumes the L (low) level, the switch 152 connects terminals b and c. As a result, the current I flows into the current source 151, the charge that has accumulated in the capacitor 153 is discharged and the voltage value V decreases in linear fashion. Thus, the triangular wave TRI1, the period of which is equal to that of the signal PCLK, is obtained. The triangular wave generator 135 is similarly constructed but, since the input clock is ⅓ PCLK', the period of the triangular wave TRI2 produced as an output is equal to one-third of the signal PCLK. In other words, the period of the signal TRI2 is three times that of the signal TRI1.

The comparators 136 and 137 compare the analog video signal AVD with the triangular wave signals TRI1 and TRI2, respectively, whereby pulse-width modulated signals PWM1 and PWM2, respectively, are obtained. Accordingly, the number of lines of the pulse-width modulated signal PWM1 is 600 and the number of lines of the pulse-width modulated signal PWM2 is 200.

The pulse-width modulated signals PWM1 and PWM2 enter the selector 138, where one is selected by the image attribute signal /IMCHR. When the signal /IMCHR is "true", i.e. at the L level, the signal PWM2, which excels in tonality, is selected. When the signal /IMCHR is "false", i.e. at the H level, the signal PWM1, which excels in resolution, is selected.

Figure 5:
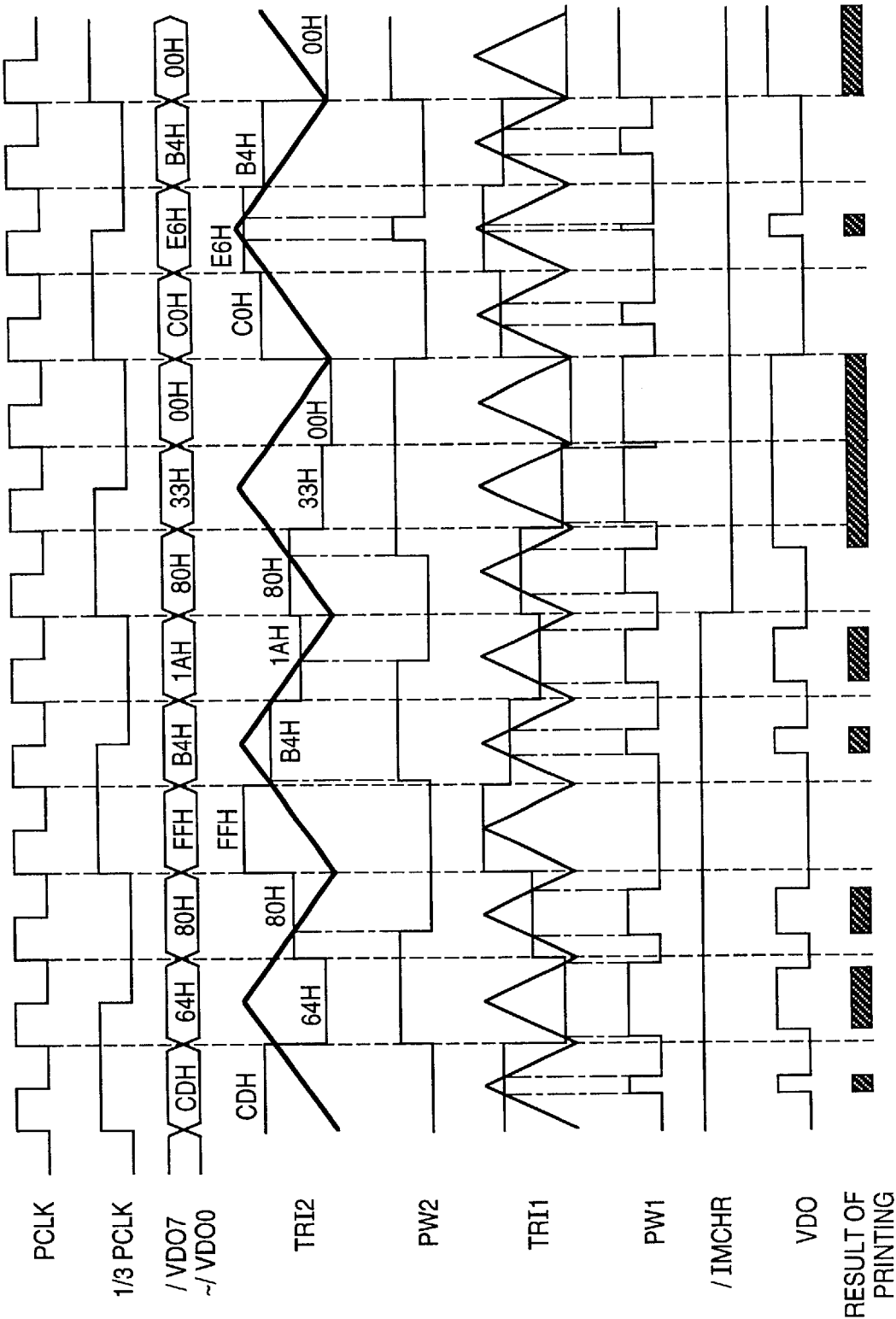
FIG. 5 is a timing circuit associated with the pulse-width modulating circuit.

The selected signal is sent to the laser driver 102 as the laser drive signal VDO. At the time of development, described later, the gradation of the image is reproduced in conformity with the pulse width of the laser drive signal VDO. FIG. 5 is a timing chart associated with the operation of the pulse-width modulating circuit 101.

With reference again to FIG. 2, the laser driver 102 turns the laser diode 103 on and off in dependence upon the laser drive signal VDO. The laser beam 127 produced by the laser diode 103, which has its optical path changed by the rotating polygon mirror 104 rotated in the direction of the arrow by a motor (not shown), is scanned across the photosensitive drum 106 in the main-scan direction at a constant speed via the image forming lens 105 placed in the optical path. A latent image is formed on the photosensitive drum 106 as a result. At this time abeam detector 107 detects the scanning starting point of the laser beam and produces a detection signal G from which the horizontal synchronizing signal /LSYNC, which is for deciding the image readout timing in the main-scan direction, is generated.

The main operation described above is repeated so that one page of a magenta latent image is formed on the photosensitive drum 106.

The location on the photosensitive drum 106 irradiated with the light attains a voltage of approximately −100 V. Furthermore, when the photosensitive drum 106 rotates in the direction of the arrow shown in FIG. 1, the latent image is made visible by the developing device 116M containing the magenta toner.

The image transfer process will now be described in detail with reference again to FIG. 1.

Recording paper (not shown) supplied from the paper cassette 110 by a pick-up roller (not shown) is gripped by a gripper 112 and then electrostatically attracted to the transfer drum 108 by an attracting roller 113 to which a voltage has been applied. Owing to a voltage impressed upon to the transfer drum 108 from a power supply (not shown), the toner image on the photosensitive drum 106 is transferred to the recording paper that has been attracted to the transfer drum 108. This process is carried out for each of the colors cyan, yellow and black, whereby multiple-color toner images are formed on the recording paper. The recording paper is then peeled off the transfer drum 108 by a separation finger 121. The toners are fused and fixed by a well-known fixing device 123, which applies heating and pressure. Residual toner on the photosensitive drum 106 is subsequently cleaned off by a well-known cleaning device 125 such as a fur brush, blade means or the like. It is also desirable to clean residual toner from the transfer drum 108 by a transfer-drum cleaning device 126 such as a fur brush or web.

Next, the photosensitive drum 106 is de-energized and initialized. In the case of the example described above, the roller-type corona discharge device 109 is used to charge the photosensitive drum 106. To remove charge from the photosensitive drum 106, the AC voltage applied by the roller 109 is left as is and the DC voltage is made substantially 0 V, thereby de-energizing the drum 106. The transfer drum 108 is de-energized and initialize by a deelectrifying roller 111.

Figure 6:
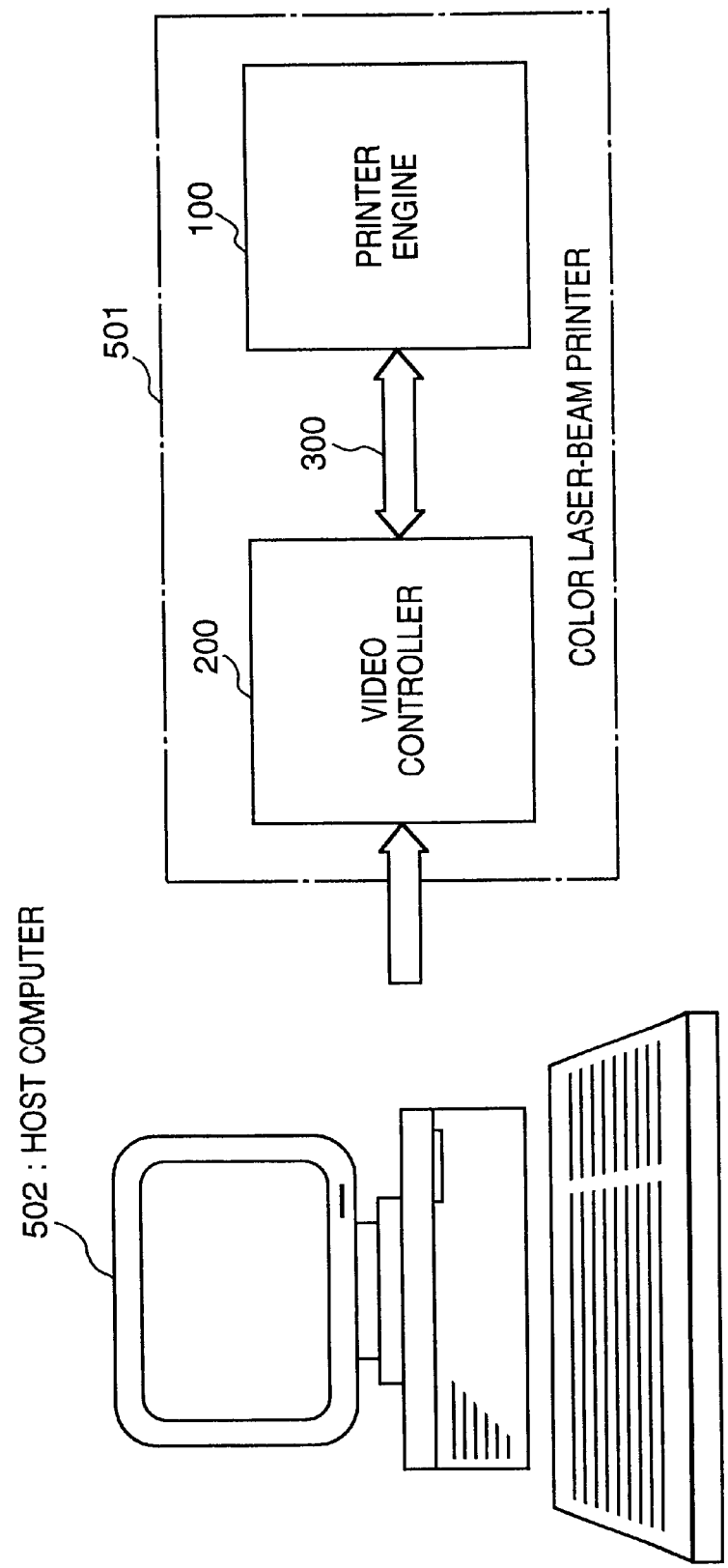
FIG. 6 is a diagram for describing an overview of a printing system that uses a laser-beam printer.

FIG. 6 shows an overview of a printing system employing the color laser-beam printer described above.

As shown in FIG. 6, a host computer 502 starts a document processing program such as a word processor that has been stored in a storage device such as a hard disk (not shown) and executes document processing of a document containing a mixture of figures, images, characters and tables (inclusive of table computations). The information representing a created document is converted to print information described in a predetermined printer language in order that printing may be performed by a laser-beam printer 501 in accordance with a printer driver program (not shown). This print information includes character codes, vector information and image information, etc. The print information resulting from the conversion is sent to the laser-beam printer 501 via an interface 503.

The laser-beam printer 501 includes a video controller 200 (also referred to simply as a "controller" below) for receiving the print information sent from the host computer 502 and generating image information comprising dot data (bitmap data) based upon the information received, and a printer engine 100 (also referred to simply as a "printer" or "engine" below) for performing recording based upon a series of electrophotographic processes which include modulating the laser in conformity with the image information sent successively from the video controller 200, forming a latent image by scanning the modulated laser beam across the photosensitive drum, transferring the image to the recording paper and then fixing the image on the recording paper. The printer engine 100 has a resolution of 600 dpi.

The laser-beam printer 501 has at least one card slot (not shown) so that an optional font card for fonts other than the internally provided fonts and a control card (emulation card) for a different language system can be connected to the printer.

The video controller 200 and printer engine 100 are connected by an interface signal line 300 (referred to as a "video interface"). The interface signals will be described briefly below (see FIG. 7). It should be noted that the slash mark "/" prefixing the signal names indicates that the signal is active when at the low level.

A signal /PPRDY is sent from the engine 100 to the controller 200. This signal indicates that the power supply of the engine 100 has been turned on and that the engine 100 is in the enabled state.

A signal /CPRDY is sent from the controller 200 to the engine 100. This signal indicates that the power supply of the controller 200 has been turned on and that the controller 200 is in the enabled state.

A signal /RDY is sent from the engine 100 to the controller 200. This signal indicates that the engine 100 is in a state in which it is capable of beginning a printing operation at any time or of continuing a printing operation if a /PRNT signal, described below, has been received. For example, in a case where it is impossible to execute a printing operation, as when the paper cassette is empty, this signal becomes "false".

The signal /PRNT is sent from the engine 100 to the controller 200. This signal specifies the start or continuation of a printing operation. The engine 100 starts a printing operation upon receiving this signal.

A signal /TOP is a signal for synchronization in the sub-scan (vertical scanning) direction and is sent from the engine 100 to the controller 200. The controller 200 sends image data in the sub-scan direction in sync with this signal, thereby transferring a toner image that has been formed on the drum to recording paper in sync with scanning in the vertical direction.

A signal /LSYNC is a signal for synchronization in the main-scan (horizontal scanning) direction and is sent from the engine 100 to the controller 200.

A signal /VDO7~/VDO0 is an image signal sent from the controller 200 to the engine 100 and represents image density information to be printed by the engine 100. This signal is represented by eight bits, in which VDO7 is the most significant bit and VDO0 the least significant bit. The engine 100 performs printing at maximum density of the toner color undergoing development when the signal /VDO7~/VDO0 is 00H and does not perform printing when the signal /VDO7~/VDO0 is FFH (where "H" represents a hexadecimal number).

A signal /IMCHR indicates image attributes and is sent from the controller 200 to the engine 100. The function of this signal will be described in detail later.

A signal VCLK is the transfer clock signal of the image signal /VDO7~/VDO0 and image attribute signal /IMCHR and is sent from the controller 200 to the engine 100. The controller 200 sends the /VDO7~/VDO0 and the IMCHR signal in sync with the leading edge of the VCLK signal.

A signal /STS is used in a case where "status" is transmitted from the engine 100 to the controller 200. "Status" is a serial signal comprising eight bits. Specifically, this is information, sent from the engine 100 to the controller 200, for notifying the controller 200 of various states of the engine 100, such as a waiting state, in which the temperature of the fixing device in engine 100 has not yet attained a temperature at which printing can be performed, a state in which paper is jammed and a state in which the paper cassette is empty. A signal /CCLK, described below, is used as a synchronizing signal when the signal /STS is transmitted.

A signal /CMD is used in a case where a "command" is sent from the controller 200 to the engine 100. "Command" is a serial signal comprising eight bits. Specifically, this is command information by which the controller 200 tells the engine 100 whether the paper supply mode is a mode for supply from the paper cassette or a mode for supply from a manual feed inlet, by way of example. The signal /CCLK, described below, is used as a synchronizing signal when the signal /CCLK is transmitted.

A signal /CBSY is for indicating to the engine 100 the fact that the controller 200 is transmitting "command" to the engine 100 using the /CMD signal.

The signal /CCLK is a synchronizing pulse signal whereby the engine 100 accepts "command" or whereby the controller 200 accepts "status". This signal is output by the controller 200.

The process through which a color image is formed in the above-described color laser-beam printer will now be set forth.

Figure 7:
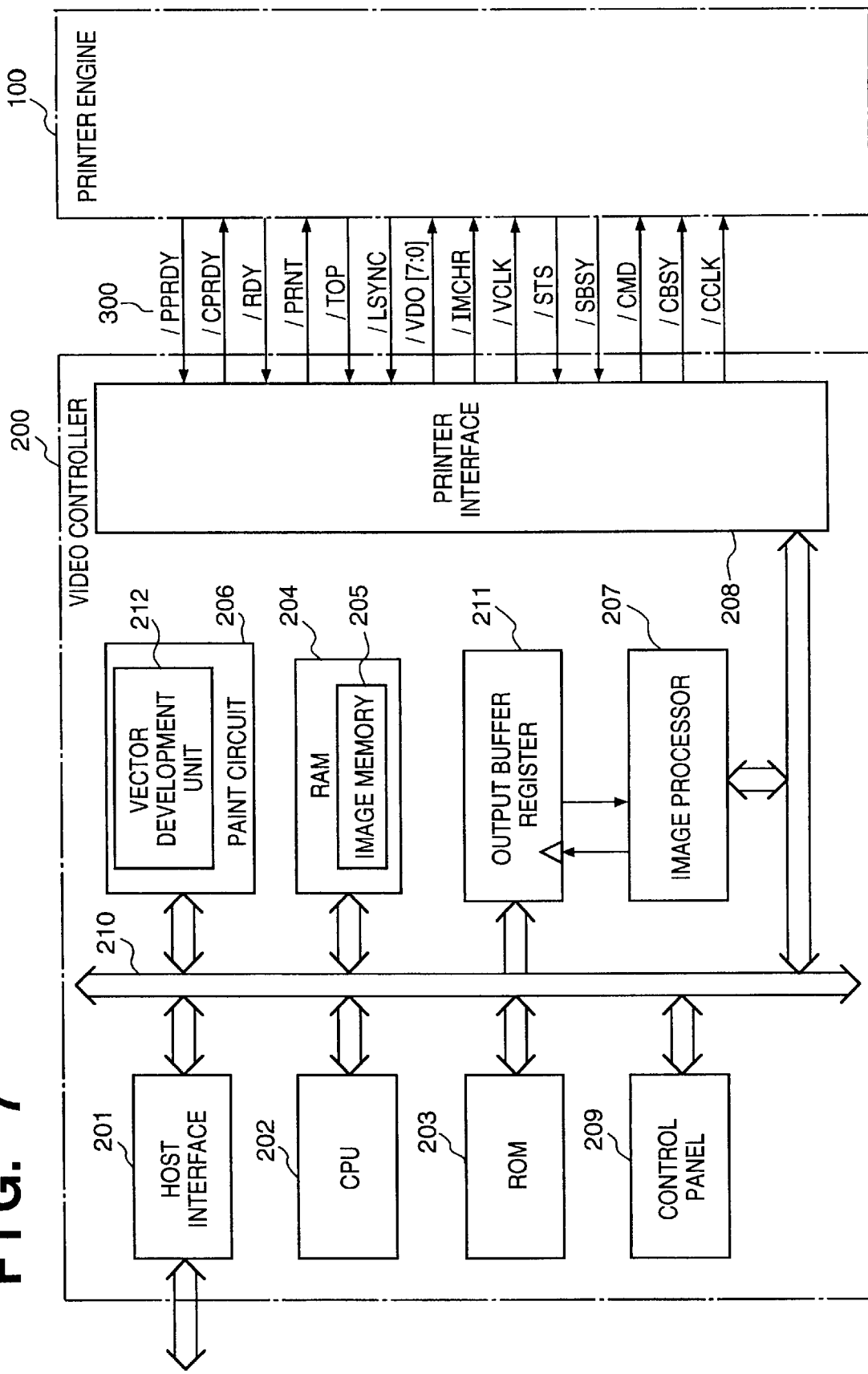
FIG. 7 is a block diagram of a video controller.

FIG. 7 is a block diagram of the video controller 200. As shown in FIG. 7, the video controller 200 includes a host interface 201 for communication with the host computer and receiving the above-mentioned print information, a CPU 202 for executing overall control of the video controller 200, a ROM 203 for storing a control program for the CPU 202 as well as font data, etc., and a RAM 204, which serves as a main memory of the CPU 202 and as a working area, and which includes an image memory 205 for storing one page of image data generated by a paint circuit 206, described below. The RAM 204 is so adapted that its memory capacity can be increased by an optional RAM connected to an extension port, not shown. The image memory 205 has enough capacity to store field-sequential sequential two-bit bitmap data of each of field-sequential colors corresponding to magenta (M), cyan (C), yellow (Y) and black (Bk) of one page to be printed.

The paint circuit 206 functions to analyze print information sent from the host computer and to generate image information comprising field-sequential bitmap data corresponding to the toner colors magenta (M), cyan (C), yellow (Y) and black (Bk) to be printed. An output buffer register circuit 211 temporarily accumulates the image information read out of the image memory 205 and converts the image information to a signal synchronized to the image signal period sent to the printer engine every horizontal scanning line. Image information read out of the image memory 205 and entered via the output buffer register 211 are output by an image processor 207 while being successively converted, by prescribed logic, to the video signal sent to the printer engine. A printer interface 208 is a circuit for interfacing the printer engine 100. A control panel 209 is manipulated by an operator so that the operator may make various printer settings and directly perform a test printing operation. The exchange of data between blocks in the controller 200 is performed via a system bus 210.

A process for generating image information in the color laser-beam printer will now be described.

As shown in FIG. 7, one page of print information sent from the host computer 502 enters the video controller 200 via the host interface 201 and is temporarily stored in the RAM 204. Next, the print information enters the paint circuit 206.

The processing executed by the paint circuit 206 will now be described.

First, print information such as a character print instruction, a figure paint instruction and an image obtained be reading in a photograph or the like enters a vector development unit 212. On the basis of the print information received, the vector development unit 212 executes processing for developing outline font data stored in the RAM 203 and for developing figure vectors. The vector development unit 212 then subjects the developed image to two-bit multivalued dither processing for each of the magenta (M), cyan (C), yellow (Y) and black (Bk) planes in succession and generates field-sequential bitmap image information of two bits each per color. The 600-dpi bitmap image information generated is sent to the image memory 205 so as to be stored in successive fashion.

The dither method is employed widely as a method of pseudo-halftoning multivalued image information. By comparing input multivalued data with a threshold value matrix, the method decides which dots should and should not be printed. The threshold value can be one of two types, namely of the type which concentrates dots or the type which disperses dots. The former is suited to electrophotography. Here the dither method and pulse-width modulation, described below, will be combined to execute multivalued dither processing in which density of a pixel is represented in four levels.

If, when one page of image information has thus been prepared in the image memory, the /RDY signal from the printer engine 100 is "true", the video controller 200 makes the /PRTN signal "true" and instructs the printer engine to begin a printing operation.

In sync with the vertical synchronizing signal /TOP output at a predetermined timing from the printer engine 100 in response to reception of the /PRTN signal, image information is read out of the image memory 205 in the video controller 200 successively starting from the first line of the horizontal scan. The image signal read out is converted to 600-dpi image (video) signals CVDO1 and CVDO0, of one bit each, by the output buffer register circuit 211. These signals enter the image processor 207. It is assumed here that the signals (CVDO1, CVDO0) indicate white (minimum density of each color) when (0,0), respectively, and indicate maximum density of each color when (1,1), respectively.

Figure 8:
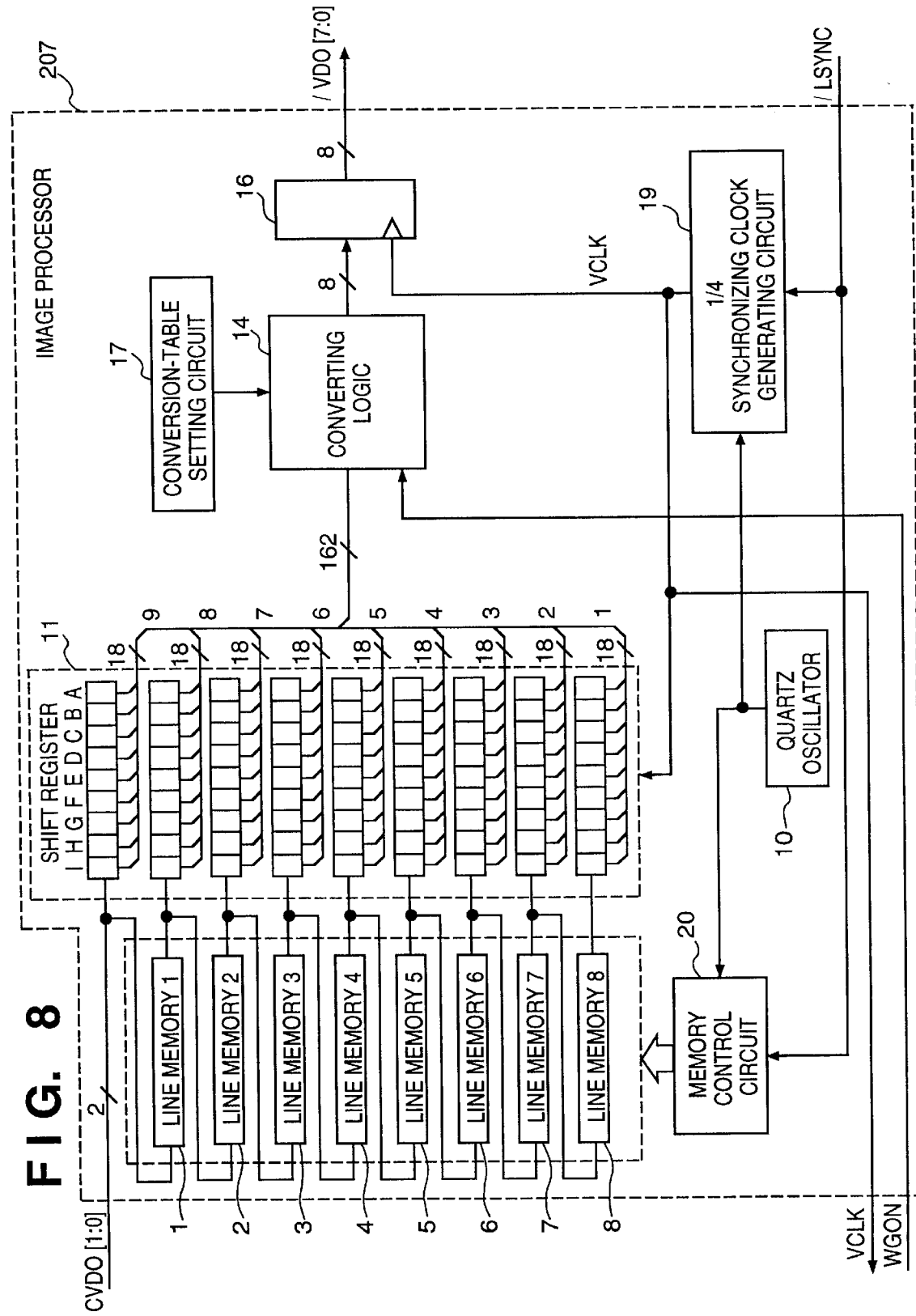
FIG. 8 is a block diagram of an image processor.

The function and operation of the image processor 207 will now be described in detail. FIG. 8 is a block diagram of the image processor 207.

As shown in FIG. 8, line memories 1~8 each have enough capacity to store one line (in the main-scan direction) of the image signals CVDO1 and CVDO0 output by the output buffer register 211. A memory control circuit 20 controls the writing and reading operations of the line memories 1~8. A quartz oscillator 10 supplies the clock.

A shift register group 11 is for referring to image data composed of nine dots by nine lines (9×9) of pixels surrounding a pixel M of interest. The shift register group 11 outputs the above-mentioned image data, while shifting these data in the main-scan direction, in dependence upon the image clock signal VCLK.

A converting logic circuit 14 refers to the data output by the shift register group 11, converts the two-bit image data of the pixel M of interest to the eight-bit multivalued image data /VDO7~/VDO0, which are to be output to the printer engine, by predetermined logic and then outputs the multivalued image data. A latch circuit 16 temporarily latches the output data from the converting logic circuit 14 so as to adjust the output timing.

A conversion-table setting circuit 17 sets a table for the conversion from two bits to eight bits in the logic converting circuit 14. A synchronizing-clock generating circuit 19 generates the image clock signal VCLK, which is synchronized to the horizontal synchronizing signal /LSYNC from the printer engine 100.

The operation of the image processor 207 constructed as set forth above will be described next. The operation described below is applied to each color component of YMCK. Then, "a white pixel" means a pixel not having a color component of interest. "A white pixel" can include color components except for the color component of interest.

As mentioned above, the 600-dpi video signals CVD01, CVDO0 of one bit each (these signals will be denoted simply by CVDO below) are successively accepted from the output buffer register 211 in sync with the image clock signal VCLK produced by the synchronizing clock generating circuit 19.

The CVDO signal of the first line and first dot that has entered the image processor 207 enters the first bit of the shift register 11 and is written in the line memory 1.

The line control circuit 20 then increments the addresses of the line memories 1~8 and writes the CVDO signal of the second dot in line memory 1. The first line of the CVDO signal is thus stored in line memory 1 in successive fashion.

When the writing of the first line of the CVDO signal is completed, the CVDO signals in the same positions as those of the first line that has been stored in the line memory 1 are read out prior to entry of the second line of the CVDO signal and these enter the respective first and second bits of the shift register 11. Thereafter the entered second line of the CVDO signal is written in line memory 1 and the signal that has been read out of the line memory 1 is written at the same address in the line memory 2.

Thus, the readout of data of the preceding line from a certain address of each line memory and the writing of data of a new line to the same address are carried out during one period of the VCLK signal. The CVDO signal which thus enters every line is written to each line memory and read out of each line memory while being shifted from line memory 1 to line memory 2, thence to line memory 3 and so on up to line memory 8. Accordingly, eight consecutive lines of the CVDO signal come to be stored in the line memories 1~8. A device such as a static RAM can be used for the line memories 1~8.

The outputs of the line memories 1~8 and the CVDO signal from the output buffer register 211 enter the shift register 11, as mentioned above. The shift register 11 simultaneously outputs, while being shifted by the VCLK signal, image signals of a total of 81 pixels, namely pixels of nine dots in the main-scan direction by nine lines in the sub-scan direction, centered on the pixel M of interest. The columns of the output data of shift register 11 are named A, B, C, D, E, F, G, H, I in the order mentioned starting from the oldest data, the rows of the output data are named 1, 2, 3, 4, 5, 6, 7, 8 in the order mentioned starting from the oldest line of data, i.e., from the row connected to line memory 8, and the row of the latest CVDO signal is named 9. Each pixel is referred to by its row and column. Since the data of a printed pixel (the pixel of interest) M is referred to as data of row 5 and column E, the pixel shall be referred to as "5E". Accordingly, from the moment the video signal CVDO enters the image processor 207 to the moment it is actually printed, a delay equivalent to four main-scan lines is produced.

On the basis of the output data from the shift register 11, the converting logic 14 converts the two bits of the pixel M of interest to eight bits. The conversion processing executed by the converting logic 14 will now be described.

In a case where the data of the pixel M of interest is non-white, i.e. if (CVDO1, CVDO0) are (0,1), (1,0) or (1,1), the conversion is to the eight-bit data set by the conversion-table setting circuit 17. For example, two-bit data are expanded uniformly to eight-bit data to effect a conversion in the manner (0,1)→ A4H (where "H" indicates a hexa- decimal number), (1,0)→ 55H, (1,1)→ 00H (maximum density). It is preferred that an arrangement be adopted in which the conversion-table setting circuit 17 can be set via the system bus 210 mentioned earlier.

Figure 9:
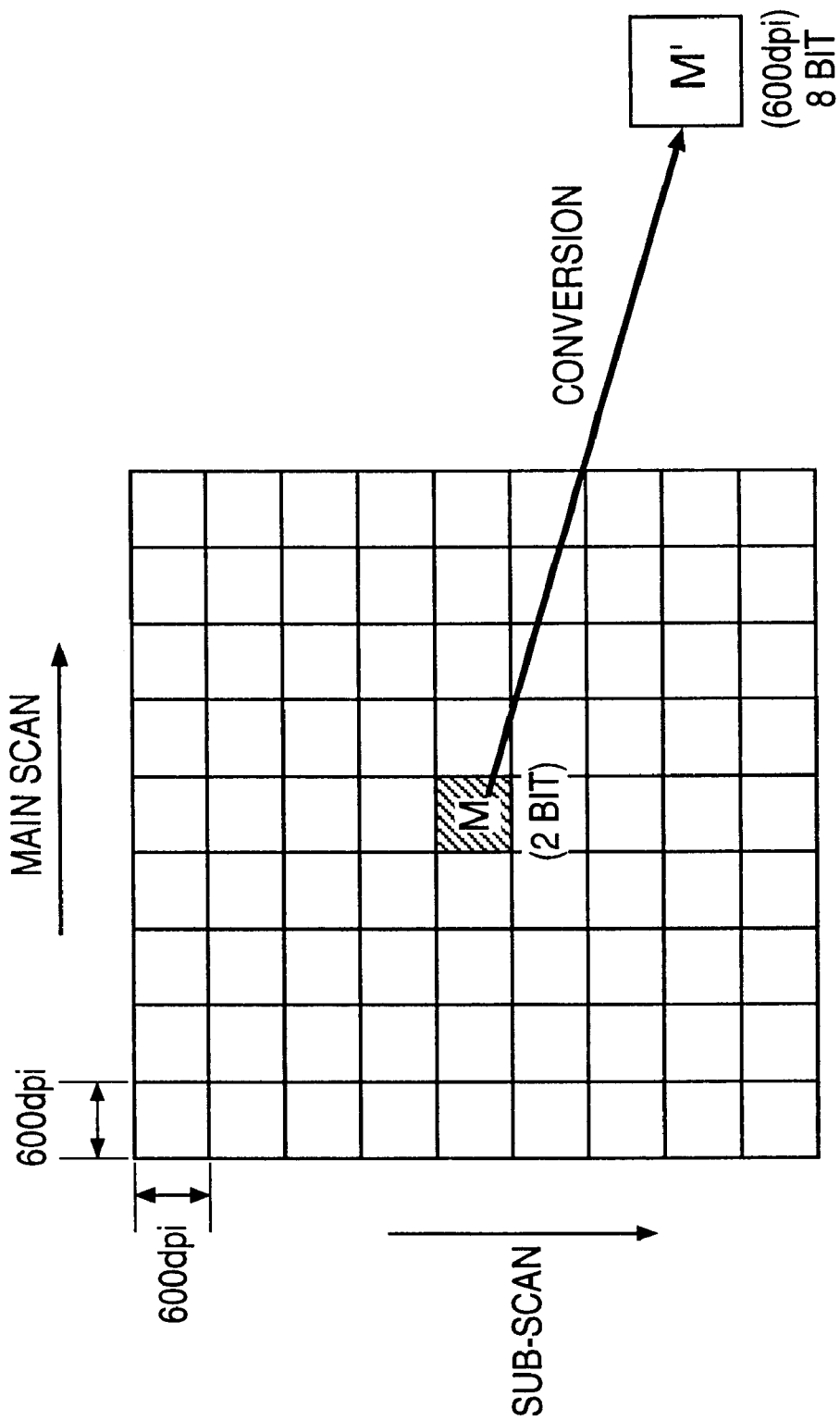
FIG. 9 is a diagram for describing an image data reference area.

In a case where the data of the pixel M of interest is indicative of white, i.e. if (CVDO1, CVDO0)=(0,0) holds, reference is made to the image data of 9 dots×9 dots centered on the pixel M of interest shown in FIG. 9, and the data of eight bits that will prevail after conversion are decided by the referential results. When the output of the shift register 11 is white data in its entirety, the data of the pixel M of interest is output as FFH (minimum density). If there is even one non-white pixel in the output from the shift register, the data of the pixel M of interest is outputted as a value that is not indicative of minimum density, e.g., as F0H, though the dot that would be formed is white. By virtue of this processing, the F0H signal will be sent from the boundary of the image of every color plane, i.e. from the boundary between a white pixel and a pixel of another color, with regard to a white image portion within a fixed area (9 dots×9 dots in this embodiment) capable of being referred to by the shift register 11.

In the aforementioned pulse-width modulation processing, the value F0H is such that toner will not attach itself to the photosensitive drum although the laser diode will fire minimally. The effects of the foregoing processing will be described below. It should be noted that this processing is capable of being turned on and off by a control signal WGON.

Figure 15:
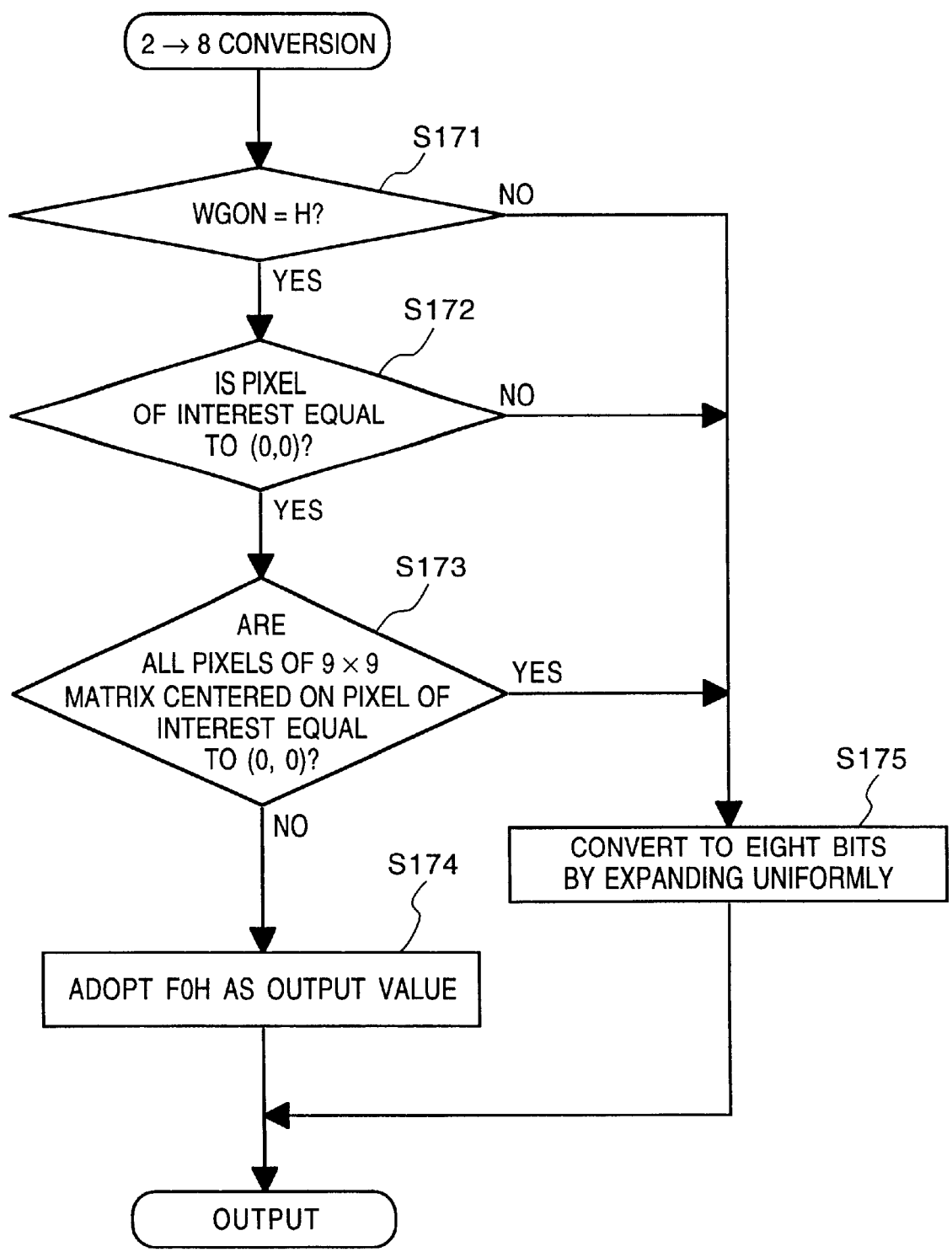
FIG. 15 is a flowchart illustrating the procedure of a two-to-eight bit conversion performed by a converting logic circuit according to a first embodiment of the invention.

FIG. 15 is a flowchart illustrating the procedure of the two-to-eight bit conversion performed by a converting logic circuit 14. This procedure may be implemented by executing a program or by a circuit having values logically equivalent to this procedure.

When the control signal WGON is found to be at the high level at step S171 in FIG. 15, it is determined at step S172 whether the pixel M of interest is (0,0), i.e. a white pixel. If the pixel M of interest is a white pixel, it is determined at step S173 whether the zone of 9×9 dots centered on the pixel M of interest is composed entirely of white pixels (0,0). If there is a pixel other than a white pixel in the zone of 9×9 dots ("NO" at step S173), then the pixel M of interest is converted to F0H at step S174 and F0H is produced as the output. If the decision rendered at step S173 is "YES", then the pixel is uniformly expanded, converted to eight bits and delivered as an output at step S175.

The pixel M of interest is uniformly expanded and converted to eight bits at step S175. However, this processing is executed in accordance with a two-to-eight bit conversion table set by the conversion-table setting circuit 17 and is not limited to a uniform expansion.

Thus, an eight-bit image signal of each color is produced and sent to the printer engine 100 as the image signal /VDO7~/VDO0 via the printer interface 208.

Pulse-width modulation processing is executed by the printer engine 100 in conformity with the values of the image signal /VDO7~/VDO0. Since two-bit multivalued dithering is used in this embodiment, the pulse-width modulation mode fixes the image attribute signal /IMCHR to the H level and selects 600 lines.

Figure 10A:
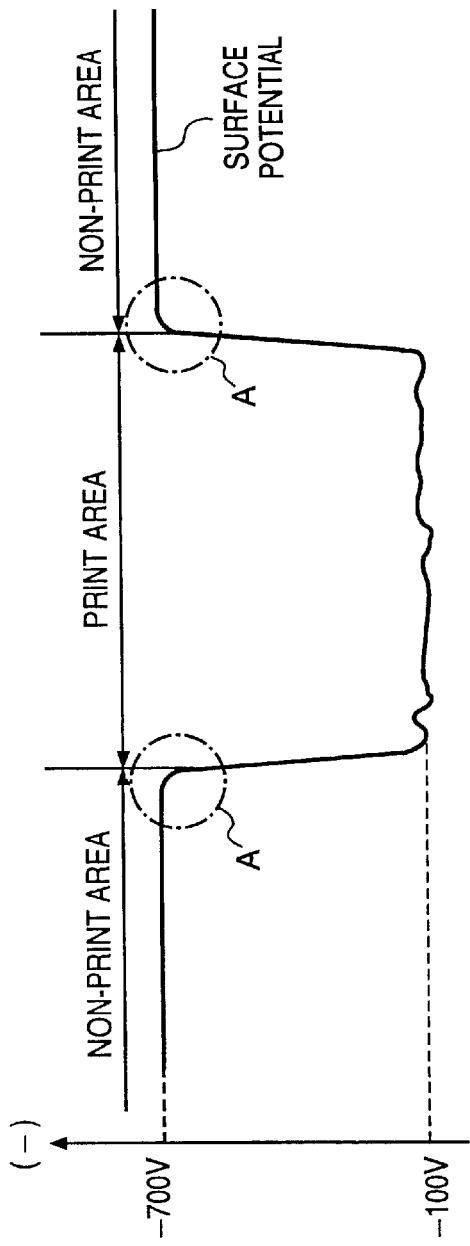
FIGS. 10A, 10B are diagrams illustrating the surface potential of a photosensitive drum at the boundary of an image.
Figure 18:
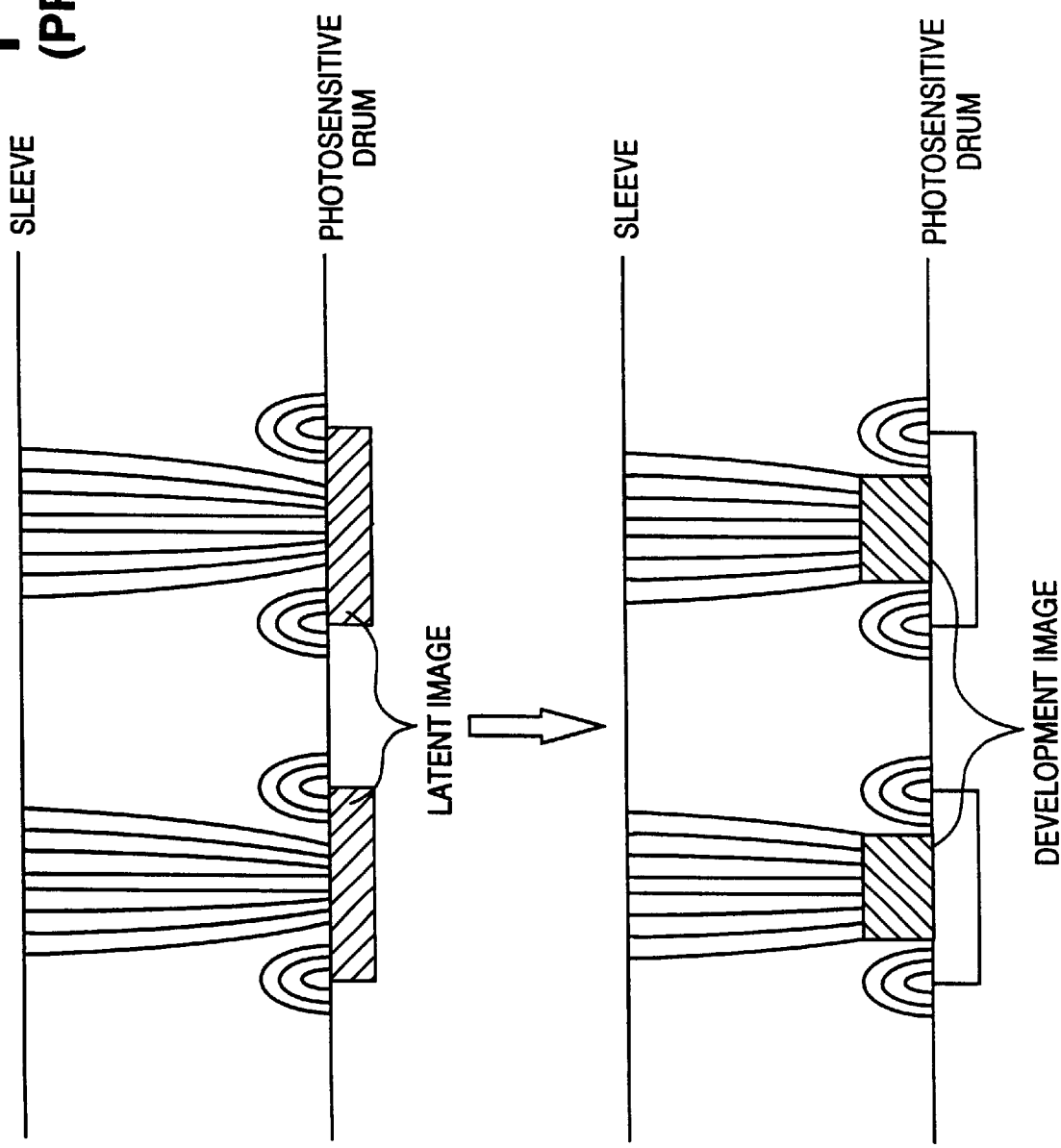
FIG. 18 is a diagram for describing an electrostatic latent image formed on a photosensitive drum according to the prior art.

This is followed by performing electrophotographic recording. The surface potential of the photosensitive drum 106 at the boundary between the maximum density image of each color and a white image is shown schematically in FIGS. 10A and 10B. The potential of a print area (maximum-density image portion) is set to about −100 V, and that of a non-print area (a white image portion) is set to about −700 V. FIG. 10A illustrates a case where boundary processing is not carried out by the procedure shown in FIG. 15. Here the involvement of the electric field illustrated in FIG. 18 is strong because the potential changes sharply at the boundary, indicated at character A, of the print area and non-print area.

Figure 10B:
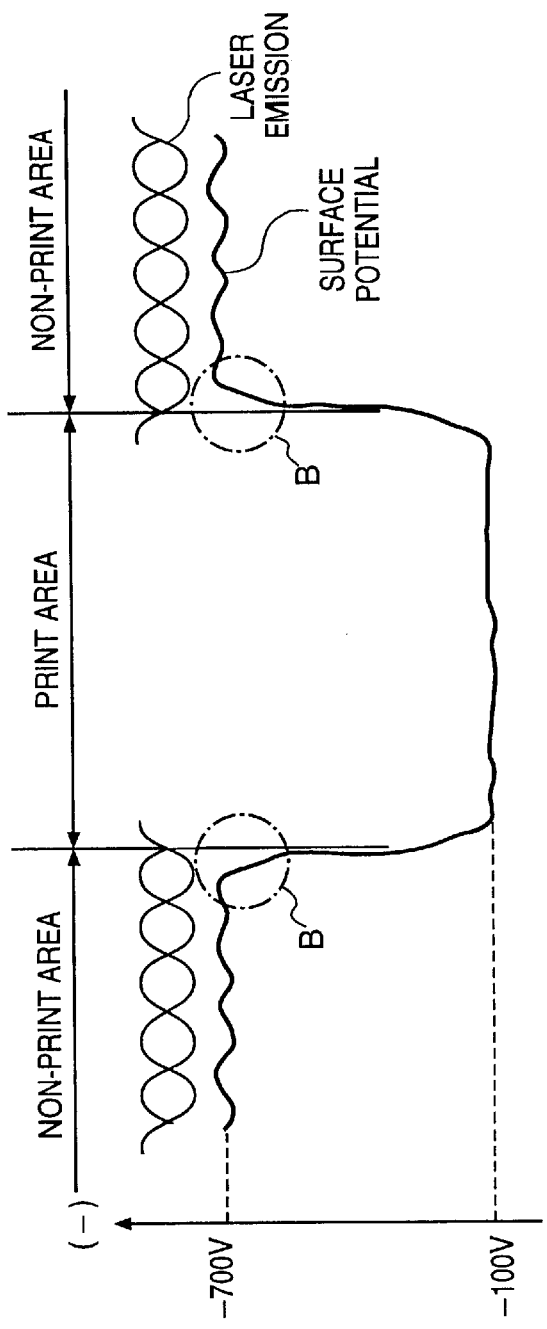

FIG. 10B shows the situation when the above-described boundary processing has been executed. Owing to the fact that a minimal laser emission is made even in the non-print area, the change in potential at the boundary, indicated at character B, of the print area and non-print area becomes a stepwise change, thereby making it possible to weaken the involvement of the electric field. As a result, it is possible to prevent narrowing of the toner image on the photosensitive drum in non-contact development caused by the fact that toner does not attach itself to portions where the electric field is involved. This means that it is possible to prevent the occurrence of spaces between different colors when color printing is carried out.

The foregoing description relates to a laser-beam printer. However, the invention is applicable to other types of electrophotographic recording apparatus such as LED printers and liquid crystal shutter-type printers. Further, a case has been described in which pulse-width modulation is used as the method of printing a multivalued image. However, the invention is applicable also to a method in which gradation is expressed by modulating the amount of light in a light beam.

(Second Embodiment)

A second embodiment of the invention will now be described. In this embodiment the processing for eliminating spaces at boundaries as described in the first embodiment is supplemented by smoothing processing applied to character and figure data.

Figure 11A:
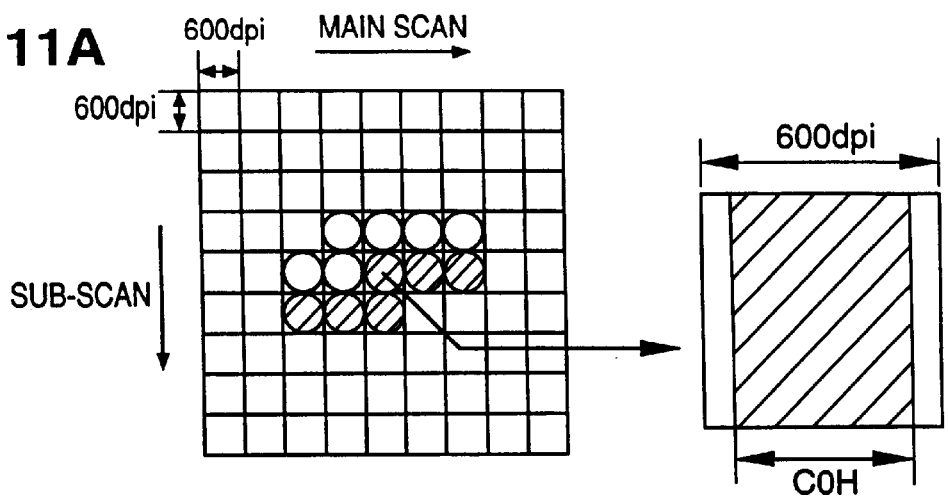
FIGS. 11A, 11B and 11C show examples of bitmap patterns for edge detection according to a second embodiment of the invention.
Figure 11B:
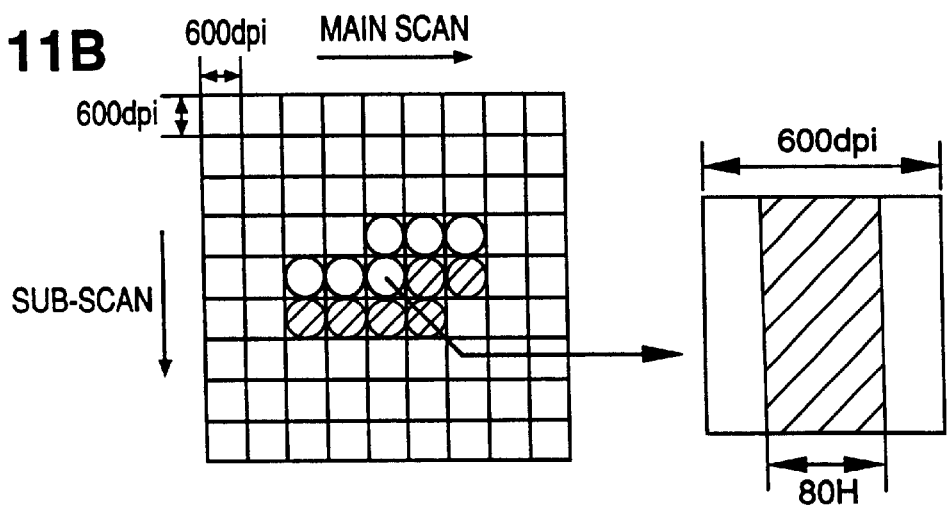
Figure 11C:
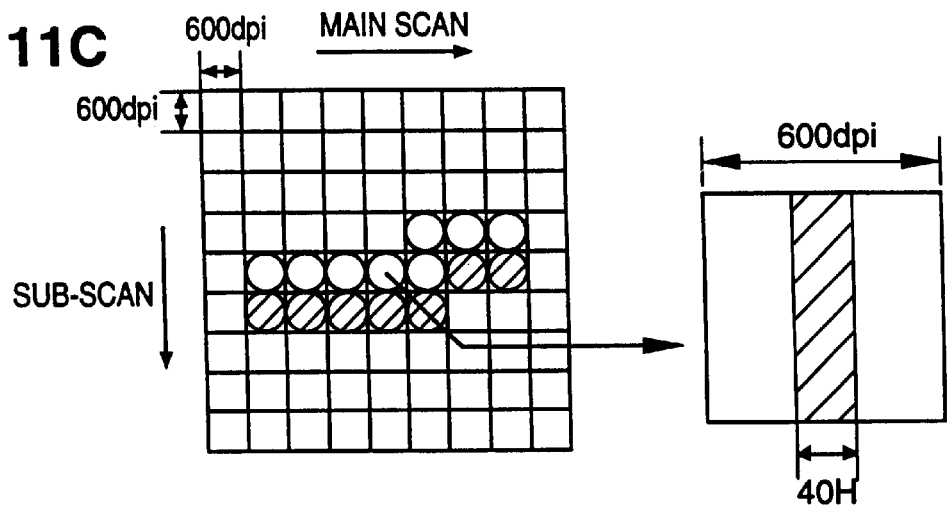
Figure 12A:
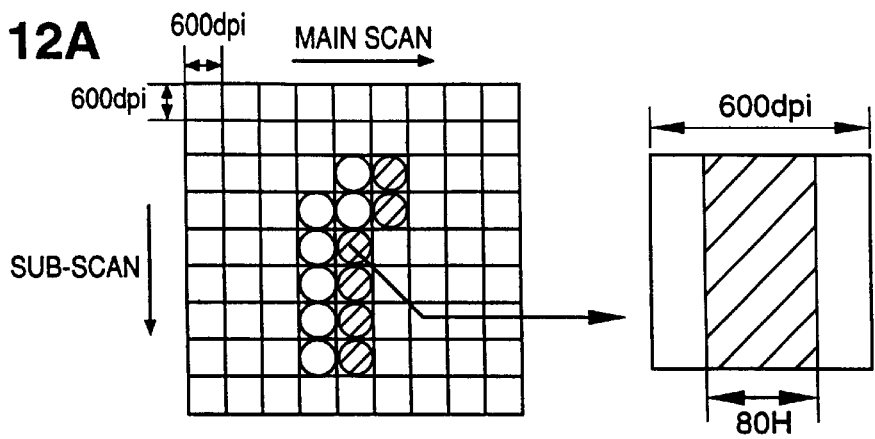
FIGS. 12A, 12B, 12C and 12D show examples of bitmap patterns for edge detection according to a second embodiment of the invention.
Figure 12B:
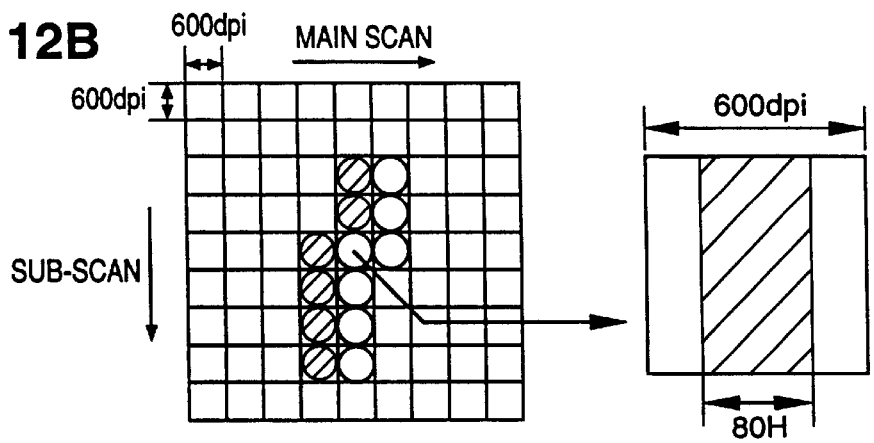
Figure 12C:
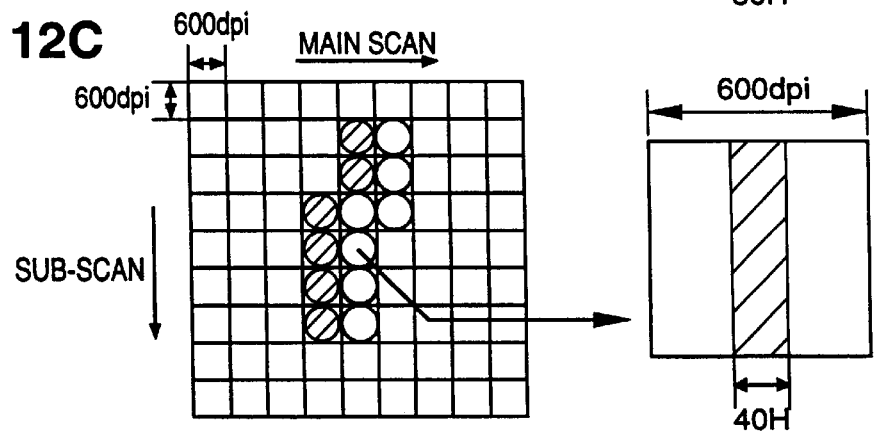
Figure 12D:
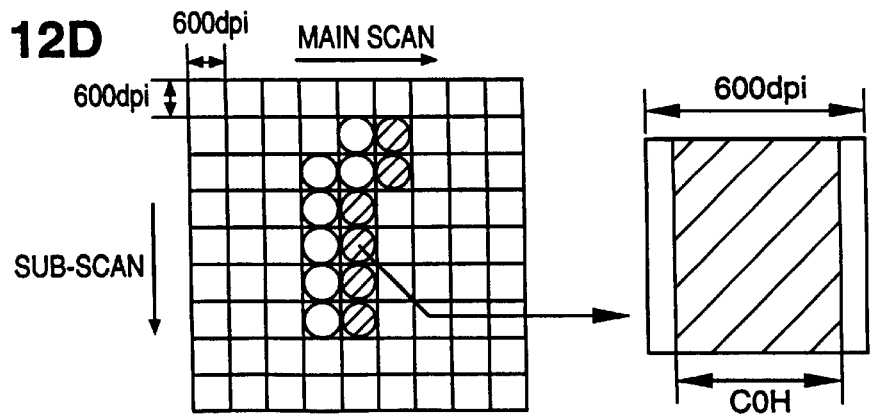

Specifically, the 81 dots of image data, namely the image data composed of nine dots in the main-scan direction by nine dots in the sub-scan direction, output by the shift register 11 are referred to in order to detect the edge of the image, and the image data of the pixel M of interest are converted to data M' so as to smooth the edge. The conversion entails comparing the output data of the shift register with a plurality of predetermined bitmap patterns for feature detection. If the output data coincide with any of the bitmap patterns, the converting logic circuit 14 converts the two bits of data representing the pixel M of interest to eight bits of a prescribed intermediate density. The bitmap patterns for feature detection are data for detecting whether the pixel M of interest is a pixel that should be converted. Examples of these feature-detection bitmap patterns are illustrated in FIGS. 11A through 11C. The black circles indicate pixels of maximum density, i.e. image data (CVDO1, CVDO0)=(1,1), and the white circles indicate pixels that are white, i.e. image data (CVDO1, CVDO0)=(0,0). Pixels not marked by black or white circles may be data of either type.

In the case of FIG. 11A, for example, the pixel M of interest is part of a slanted line that is almost horizontal (almost parallel to the main-scan direction) and is regarded as a point at which there is a change on the high-density side. Here the original data are converted to multivalued value of C0H. In the case of FIG. 11B, the pixel M of interest is part of a slanted line that is almost horizontal and is regarded as a point at which there is a change on the low-density (white) side. Here the original data are converted to multivalued value of 80H. In the case of FIG. 11C, the pixel M of interest is part of a slanted line that is almost horizontal and is regarded as a point at which there is a change on the low-density (white) side. However, since the pixel M is one dot removed from the point at which the change takes place, the original data are converted to multivalued value of 40 H.

Similarly, FIGS. 12A through 12D illustrate examples of bitmap patterns for detecting a slanted line that is nearly vertical (almost parallel to the sub-scan direction). These patterns are obtained by subjecting the patterns shown in FIGS. 11A~11C to a vertical-to-horizontal conversion. Accordingly, the value of the pixel of interest is decided in the same manner as described in connection with FIGS. 11A~11C.

The bitmap patterns for detecting features are formed by well-known AND-OR circuits or memories. What are shown in FIGS. 11A~11C and FIGS. 12A~12D are examples of feature-detection bitmap patterns; a number of bitmap patterns, such as patterns for detecting slanted lines having other inclinations, are prepared. In addition, patterns having vertical and left-right symmetry with respect to each of these patterns are prepared.

Furthermore, it is preferred that an arrangement be adopted in which intermediate density data after the conversion from data M to data M' are capable of being set from an operation panel or from the host side as necessary.

A pixel which does not coincide with any of the above-mentioned feature-detecting bitmap patterns is converted to eight-bit multivalued image data that have been set by the conversion-table setting circuit 17.

Figure 16:
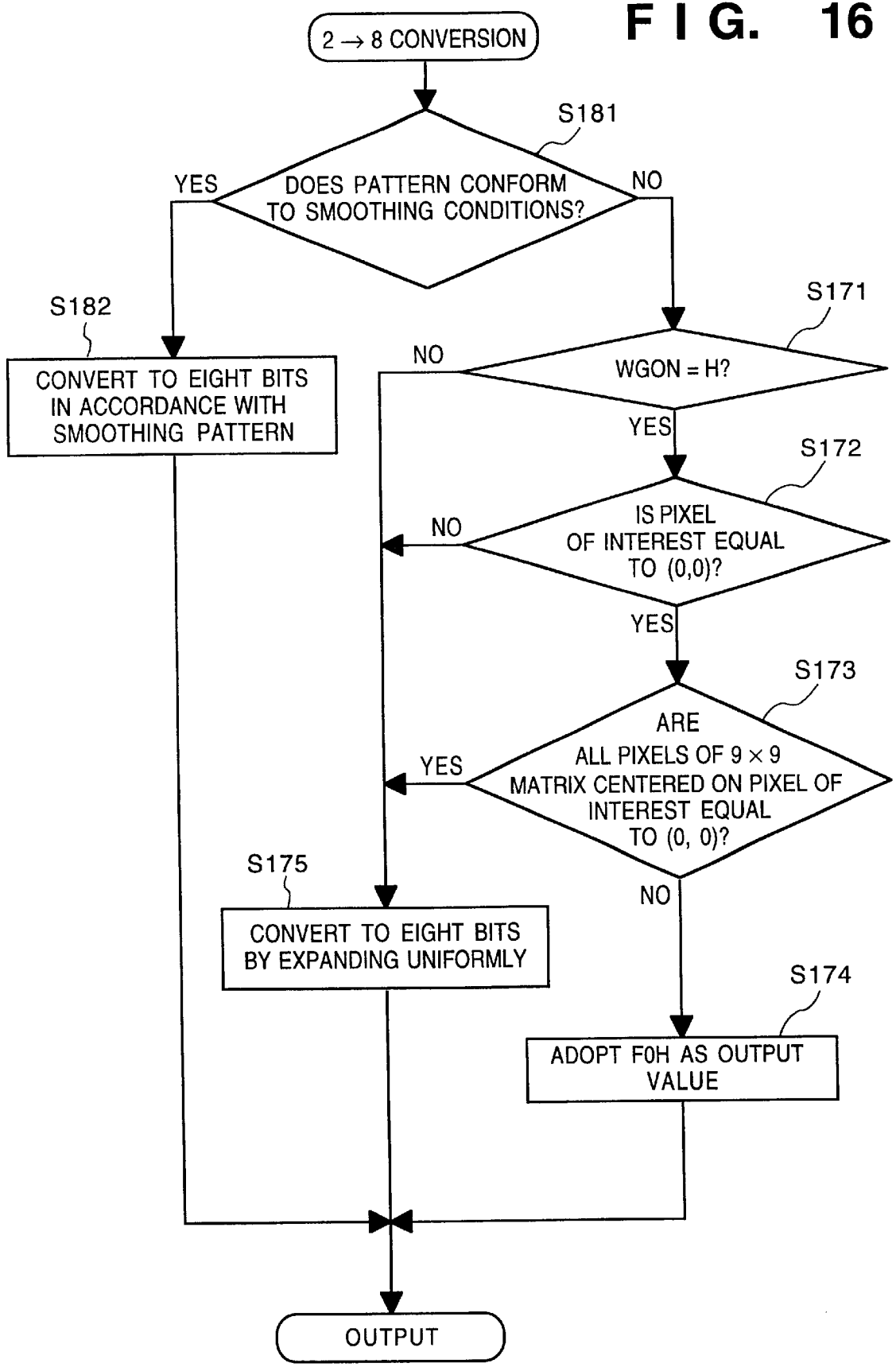
FIG. 16 is a flowchart illustrating the procedure of a two-to-eight bit conversion performed by a converting logic circuit according to a first embodiment of the invention.
Figure 17A:
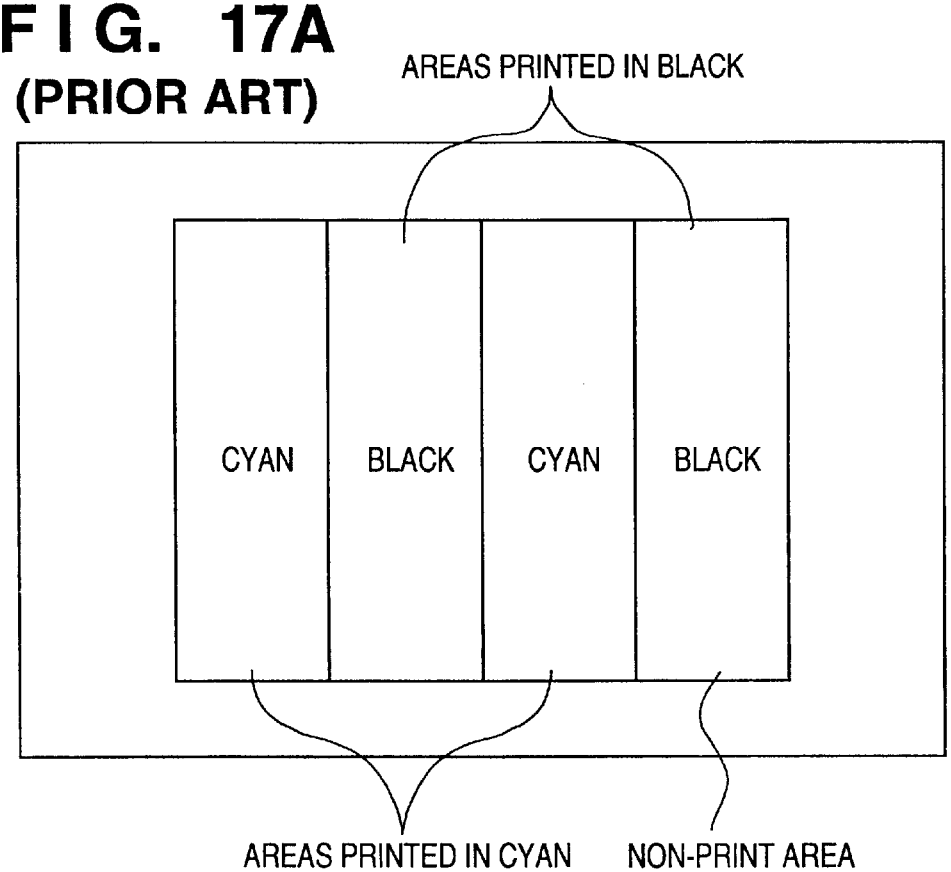
FIGS. 17A, 17B are diagrams for describing results of multiple-color printing according to the prior art.
Figure 17B:
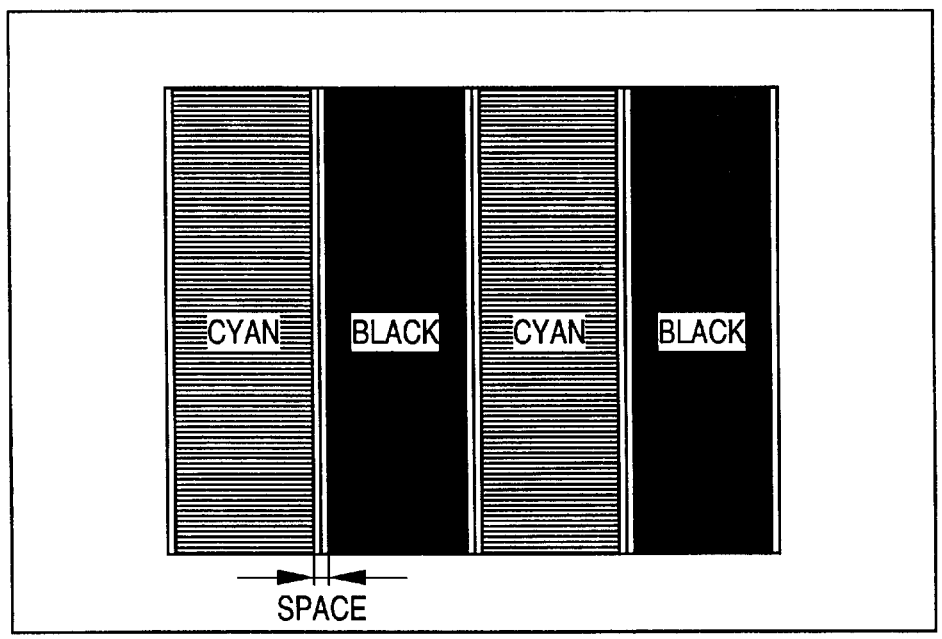

FIG. 16 is a flowchart illustrating the procedure of a two-to-eight bit conversion performed by the converting logic circuit 14 according to this embodiment. Here, prior to the processing (steps S171~S175) in which reference is had to the 9×9 pixel area centered on the pixel of interest as described in the first embodiment, it is determined whether the pattern of pixels peripheral to the pixel of interest coincides with a feature-detecting bitmap pattern, namely whether the pattern of pixels conforms to the conditions for smoothing processing. Specifically, at step S181 in FIG. 16, it is determined whether the pattern of the pixels neighboring the pixel of interest is a pattern of the kind shown in FIG. 13 or FIG. 14. If the answer is "NO", then, in accordance with the procedure for preventing narrowing of the toner image illustrated in the first embodiment, the two-to-eight bit conversion is carried out (steps S171~S175). If the pattern of the pixels neighboring the pixel of interest does conform to the smoothing conditions ("YES" at step S181), however, then the pixel of interest is converted to eight bits in accordance with the smoothing pattern thereof (step S182). As in the first embodiment, this procedure can be implemented by a program or by logic circuitry.

It is desired that whether or not smoothing processing is to be applied to the edge portion of character of figure data be specifiable from the operation panel or host computer.

Thus, an eight-bit image signal for each color is generated and sent to the printer engine 100 as the image signal /VDO7~/VDO0 via the printer interface 208.

The printer engine 100 executes pulse-width conversion processing in conformity with the value of the image signal /VDO7~/VDO0 in the same manner as in the first embodiment.

Figure 14A:
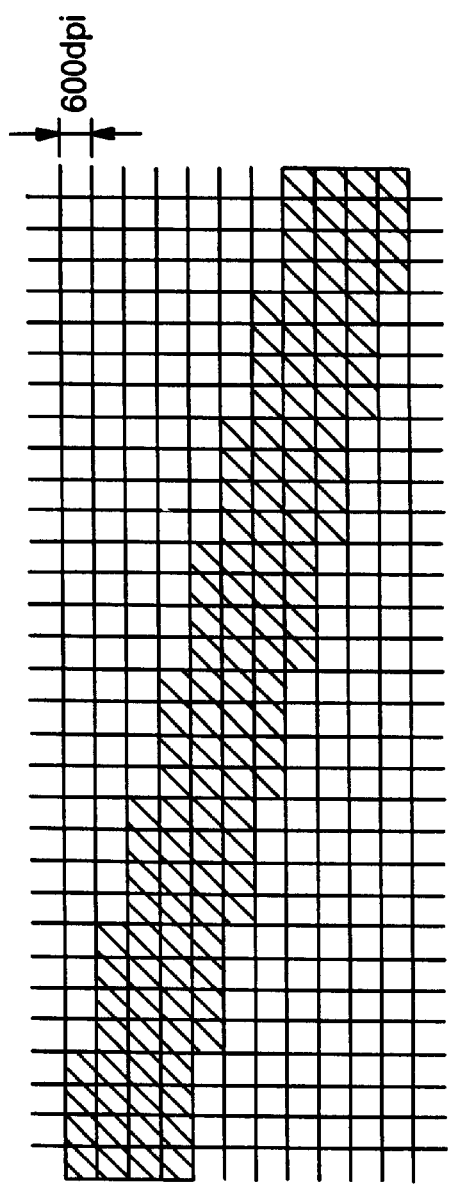
FIGS. 14A, 14B are diagrams illustrating results of printing the image of an edge portion according to the second embodiment.
Figure 14B:
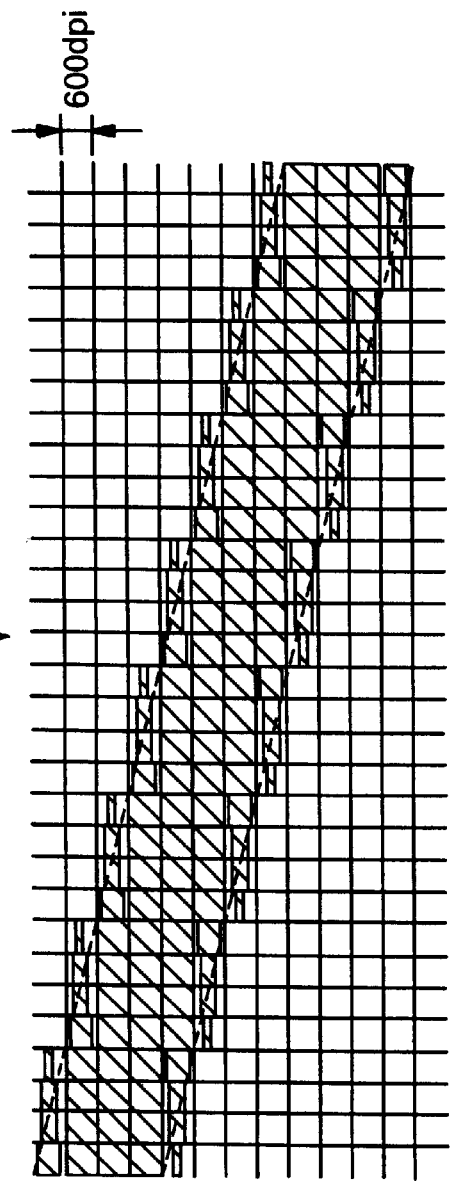

FIGS. 13A, 13B schematically illustrate an example of an image thus recorded in a case where a slanted light is nearly horizontal, and FIGS. 14A, 14B schematically illustrate an example of an image thus recorded in a case where a slanted light is nearly vertical. FIGS. 13A, 14A digitally illustrate images printed based upon the 600 dpi original data (without smoothing processing), and FIGS. 13B, 14B digitally illustrate images printed based upon multivalued data that have been smoothed by the converting logic circuit 14. FIG. 13B corresponds to the conversion shown in FIGS. 11A~11C, and FIG. 14B corresponds to the conversion shown in FIGS. 12A~12D.

The image actually printed has an edge fuzzier than that illustrated owing to the characteristics of the electrophotographic process. In particular, in the smoothed image shown in FIGS. 13B and 14B, the dots of intermediate density printed at the points where the edge changes become fuzzy at the time of development owing to such factors as the energy distribution of the photosensitive drum and the particle diameter of the developer (toner). As a consequence, the image actually printed is printed smoothly, as indicated by the dashed lines in FIGS. 13B and 14B. Thus, a smoothing effect is produced by printing, at intermediate density, the pixels in the vicinity of the points at which the edge changes. It should be noted that one box in the grids shown in FIGS. 11A~14B indicates one dot of 600 dpi.

Thus, in accordance with this embodiment as described above, a high-quality output image can be obtained by subjecting characters and figures to edge smoothing processing in addition to the processing for eliminating spaces at the boundaries of colors described in the first embodiment. An advantage is that a considerable part of a hard disk can be shared for both space elimination processing and edge smoothing processing.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

Thus, in accordance with the image output apparatus method according to the present invention, as described above, it is possible to prevent the narrowing of a toner image on a photosensitive drum in non-contact development. As a result, it is possible to prevent the occurrence of spaces between different colors when color printing is carried out.

Further, by smoothing the edge of an image, it is possible to print out an image having an outline smoother than that which would be obtained with the original resolution.

What is claimed is:

1. A multiple-color image output apparatus for forming a color image by successively superimposing images of a plurality of color elements on a transfer member, comprising:

image generating means for generating a bitmap image in each color;

an image bearing body having a surface on which a latent image is formed by an electric potential distribution;

latent-image forming means for forming a latent image on said image bearing body by referring to a pixel of interest in the bitmap image and a group of pixels neighboring the pixel of interest and, if the pixel of interest is a white pixel and the group of pixels neighboring the pixel of interest includes a non-white pixel, forming the latent image corresponding to the pixel of interest on said image bearing body at a potential for which there is a prescribed difference relative to a potential corresponding to the white pixel and at which the latent image will not be rendered visible; and developing means for developing the latent image on said image bearing body into a visible image.

2. The apparatus according to claim 1, wherein said latent image forming means forms a latent image corresponding to the pixel of interest such that a transient electric potential distribution from a white pixel to a pixel of maximum density will be obtained if the pixel of interest and the group of pixels neighboring the pixel of interest are a predetermined pattern which forms a slanted line with respect to a scanning correction.

3. The apparatus according to claim 1, wherein said latent image forming means comprises a pulse-width modulator which forms an electric potential distribution by irradiating said image bearing body with a light signal that has been pulse-width modulated based upon values of the pixel of interest and of the pixels neighboring the pixel of interest.

4. The apparatus according to claim 3, wherein said latent image forming means comprises a pulse-width modulator which forms a latent image by irradiating said image bearing body with a light signal in which the pulse width of the light signal, which corresponds to the pixel of interest, is made a predetermined pulse width for forming a latent image at a potential at which the pixel of interest will not be rendered visible if the pixel of interest is a white pixel and the group of pixels neighboring the pixel of interest includes a non-white pixel.

5. The apparatus according to claim 3, wherein said latent image forming means comprises a pulse-width modulator which forms a latent image by irradiating said image bearing body with a light signal in which the pulse width of the light signal, which corresponds to the pixel of interest, is made a Transient pulse from a white pixel to a pixel of maximum density if the pixel of interest and the group of pixels neighboring the pixel of interest are a predetermined pattern which forms a slanted line with respect to a scanning direction.

6. The apparatus according to claim 1, wherein said latent image forming means has storage means for storing an array of a predetermined number of pixels centered on the pixel of interest in the bitmap image, the array of pixels stored by said storage means being referred to as the pixel of interest and the group of pixels neighboring the pixel of interest.

7. A multiple-color image output method for forming a color image by forming a latent image on a surface of an image bearing body by distributing an electric potential on the surface and successively superimposing visible developed images, which correspond to the latent image, of a plurality of color elements on a transfer member, comprising:

an image generating step of generating a bitmap image in each color;

a latent-image forming step of forming a latent image on said image bearing body by referring to a pixel of interest in the bitmap image and a group of pixels neighboring the pixel of interest and, if the pixel of interest is a white pixel and the group of pixels neighboring the pixel of interest includes a non-white pixel, forming the latent image corresponding to the pixel of interest on the image bearing body at a potential for which there is a prescribed difference relative to a potential corresponding to the white pixel and at which the latent image will not be rendered visible; and a developing step of developing the latent image on the image bearing body into a visible image.

8. The method according to claim 7, wherein said latent image forming step includes a step of forming a latent image corresponding to the pixel of interest such that a transient electric potential distribution from a white pixel to a pixel of maximum density will be obtained if the pixel of interest and the group of pixels neighboring the pixel of interest are a predetermined pattern which forms a slanted line with respect to a scanning direction.

9. The method according to claim 7, wherein said latent image forming step includes a step of forming an electric potential distribution by irradiating said image bearing body with a light signal that has been pulse-width modulated based upon values of the pixel of interest and of the pixels neighboring the pixel of interest.

10. The method according to claim 9, wherein said latent image forming step includes a step of forming a latent image by irradiating said image bearing body with a light signal in which the pulse width of the light signal, which corresponds to the pixel of interest, is made a predetermined pulse width for forming a latent image at a potential at which the pixel of interest will not be rendered visible if the pixel of interest is a white pixel and the group of pixels neighboring the pixel of interest includes a non-white pixel.

11. The method according to claim 9, wherein said latent image forming step includes a step of forming a latent image by irradiating said image bearing body with a light signal in which the pulse width of the light signal, which corresponds to the pixel of interest, is made a transient pulse from a white pixel to a pixel of maximum density if the pixel of interest and the group of pixels neighboring the pixel of interest are a predetermined pattern which forms a slanted line with respect to a scanning direction.

12. The method according to claim 7, wherein said latent image forming step includes a storage step of storing an array of a predetermined number of pixels centered on the pixel of interest in the bitmap image, the array of pixels stored by said storage means being referred to as the pixel of interest and the group of pixels neighboring the pixel of interest.

13. A multiple-color image processing apparatus comprising:

means for referring to data of a pixel of interest and of pixels neighboring the pixel of interest on a per color-component basis;

means for determining, based upon the data referred to and on a per color-component basis, whether the pixel of interest includes a non-recording pixel and the neighboring pixels include recording pixels; and means for converting data of the pixel of interest to data of a third level between a first level corresponding to the non-recording pixel and a second level corresponding to a recording pixel in a case where the determination made by said determining means is affirmative.

14. The apparatus according to claim 13, further comprising means for forming a latent image of each color component based upon the data of every pixel.

15. The apparatus according to claim 13, further comprising means which, in a case where the determination made by said determining means is negative, is for outputting the data of the first level if the pixel of interest is a non-recording pixel and outputting the data of the second level if the pixel of interest is a recording pixel.

16. A multiple-color image processing method comprising the step of:

referring to data of a pixel of interest and of pixels neighboring the pixel of interest on a per color component basis;

determining, based upon the data referred to and on a per color-component basis, whether the pixel of interest includes a non-recording pixel and the neighboring pixels include recording pixels; and converting data of the pixel of interest to data of a third level between a first level corresponding to the non-recording pixel and a second level corresponding to a recording pixel in a case where the determination made at said determining step is affirmative.

17. The method according to claim 16, further comprising a step of forming a latent image of each color component based upon the data of every pixel.

18. The method according to claim 16, further comprising a step which, in a case where the determination made at said determining step is negative, is a step of outputting the data of the first level if the pixel of interest is the non-recording pixel and outputting the data of the second level if the pixel of interest is a recording pixel.

19. A multiple-color image forming apparatus for forming an image using a light-emitting element, comprising:

first control means for causing the light-emitting element to emit light at a first light-emission quantity in regard to non-recording pixels, and each neighboring area of the non-recording pixels does not include any recording pixel;

second control means for causing the light-emitting element to emit light at a second light-emission quantity greater than the first light-emission quantity in regard to recording pixels; and third control means for causing the light-emitting element to emit light at a third light-emission quantity between the first and second light-emission quantities in regard to non-recording pixels, and each neighboring area of the non-recording pixels includes a recording pixel.

20. The apparatus according to claim 19, wherein the neighboring area is an area having a width of several pixels about a pixel of interest.

21. The apparatus according to claim 19, wherein said first through third control means cause the light-emitting element to emit light at the first through third light-emission quantities by causing the light-emitting element to emit light in pulses and controlling the width of the pulses.

22. A multiple-color image forming method for forming an image using a light-emitting element, comprising:
   a first control step of causing the light-emitting element to emit light at a first light-emission quantity in regard to non-recording pixels in a neighboring area;
   a second control step of causing the light-emitting element to emit light at a second light-emission quantity greater than the first light-emission quantity in regard to recording pixels; and
   a third control step of causing the light-emitting element to emit light at a third light-emission quantity between the first and second light-emission quantities in regard to non-recording pixels which include a recording pixel in the neighboring area.

23. The method according to claim 22, wherein the neighboring area is an area having a width of several pixels about a pixel of interest.

24. The method according to claim 22, wherein said first through third control steps cause the light-emitting element to emit light at the first through third light-emission quantities by causing the light-emitting element to emit light in pulses and controlling the width of the pulses.

25. A color image forming apparatus for forming a color image by overlaying a plurality of mono-color images which are formed by different color materials, comprising:
   a photosensitive drum;
   a light source for emitting light to expose said photosensitive drum; and
   converting means for converting image data representing an image to be formed into a modulation signal for modulating the light emitted from said light source,
   wherein, in a case that the image data represents an image in which a first area having a color of a first color material in a first density and a second area having a color of a second color material in a second density are closely arranged, said converting means converts the image data into the modulation signal so that, even if the first density or the second density is not a maximum density, an area, where neither the first nor the second color materials exists, is not formed in a boundary between the first and the second area.

26. An apparatus according to claim 25, wherein said color image forming apparatus forms a color image by superimposing images of a plurality of color materials on a transfer member.

27. An apparatus according to claim 25, further comprising means generating the image data based upon print information from an apparatus connected to said color image forming apparatus.

28. An apparatus according to claim 25, wherein said converting means further includes processing means for generating image data so that an area, where neither the first nor the second color materials exists, is not formed in a boundary between the first and the second areas, by converting image data of a pixel of interest based upon the image data of the pixel of interest and pixels neighboring the pixel of interest.

29. An apparatus according to claim 28, wherein said processing means generates the image data so that a density level of a pixel located near and outside a border of each of the first and second areas becomes closer to a density level of a pixel inside each of the first and second areas.

30. An apparatus according to claims 25, wherein light emitted from said light source is modulated by said modulation signal by using pulse-width modulation or modulation of the amount of light.

31. An apparatus according to claim 25, wherein said image forming apparatus is a laser beam printer, a LED printer or a liquid crystal shutter-type printer.

32. An apparatus according to claim 25, wherein said converting means further includes smoothing means for performing smoothing processing in which image data of a pixel of interest is converted based upon image data of the pixel of interest and neighboring pixels of the pixel of interest so that image data representing a smoothed image is generated.

33. An apparatus according to claim 32, wherein said converting means further includes selecting means for selecting whether or not smoothing processing is performed.

34. An apparatus according to claim 32, wherein said smoothing means further includes storing means which stores data of a plurality of patterns to be compared with the image data of a plurality of patterns to be compared with the image data of the pixel of interest and the neighboring pixels of the pixel of interest.

35. A color image forming method of forming a color image by overlaying a plurality of mono-color images which are formed by different color materials, comprising the steps of:
   converting image data representing an image to be formed into a modulation signal for modulating light emitted from a light emitting source; and
   forming an image on a photosensitive drum by emitting light from the light source based upon the modulation signal,
   wherein, in a case that the image data represents an image in which a first area having a color of a first color material in a first density and a second area having a color of a second color material in a second density are closely arranged, then the image data is converted, in said conversion step, into the modulation signal so that, even if the first density or the second density is not a maximum density, an area, where neither the first nor the second color materials exists, is not formed in a boundary between the first and the second area.

36. A method according to claim 35, wherein a color image is formed by superimposing images of a plurality of color materials on a transfer member.

37. A method according to claim 35, further comprising a step of generating the image data based upon print information transferred from an external apparatus.

38. A method according to claim 35, wherein said converting step further includes a processing step of generating image data so that an area, where neither the first nor the second color materials exist, is not formed in a boundary between the first and the second area, by converting image data of the pixel of interest and pixels neighboring the pixel of interest.

39. A method according to claim 38, wherein the image data is generated in said processing step so that a density level of a pixel located near and outside a border of each of the plural areas becomes closer to a density level for a pixel inside each of the first and second areas.

40. A method according to claim 35, wherein light emitted from said light source is modulated by said modulation signal by using pulse-width modulation or modulation of the amount of light.

41. A method according to claim 35, wherein said image forming method is applied to a laser beam printer, a LED printer or a liquid crystal shutter-type printer.

42. A method according to claim 35, wherein said converting step further includes a smoothing step of performing smoothing processing in which image data of a pixel of interest is converted based upon image data of the pixel of interest and neighboring pixels of the pixel of interest so that image data representing a smoothed image is generated.

43. A method according to claim 42, wherein said converting step further includes a selecting step of selecting whether or not the smoothing processing is performed.

44. A method according to claim 42, wherein said smoothing step further includes a storing step of storing data of a plurality of patterns to be compared with the image data of the pixel of interest and the neighboring pixels of the pixel of interest.

* * * * *

UNITED STATES PATENT AND TRADEMARK OFFICE
CERTIFICATE OF CORRECTION

PATENT NO. : 6,271,868 B1
DATED : August 7, 2001
INVENTOR(S) : Atsushi Kashihara It is certified that error appears in the above-identified patent and that said Letters Patent is hereby corrected as shown below:

<u>Title page,</u>
Item [57], ABSTRACT,
Line 2, "produces" should read -- produced --.

<u>Column 1,</u>
Line 31, "evel-" should read -- devel --.

<u>Column 4,</u>
Line 7, "11A, 11B and 11C" should read -- 11A to 11C --; and
Line 10, "12A, 12B, 12C and 12D" should read -- 12A to 12D --; and
Line 59, "means, not shown." should read -- means (not shown). --.

<u>Column 5,</u>
Line 52, "valve" should read -- value --.

<u>Column 6,</u>
Line 46, "abeam" should read -- a beam --; and
Line 67, "upon to" should read -- upon --.

<u>Column 7,</u>
Line 22, "initialize" should read -- initialized --.

<u>Column 9,</u>
Line 25, "port, not shown." should read -- port (not shown) --; and
Line 61, "be" should read -- by --.

<u>Column 10,</u>
Line 59, "logic converting" should read -- converting logic --.

<u>Column 11,</u>
Line 58, "logic" should read -- logic circuit --; and
Line 60, "logic" should read -- logic circuit --.

<u>Column 14,</u>
Line 4, "40 H." should read -- 40H. --.

UNITED STATES PATENT AND TRADEMARK OFFICE
CERTIFICATE OF CORRECTION

PATENT NO.    : 6,271,868 B1
DATED         : August 7, 2001
INVENTOR(S)   : Atsushi Kashihara It is certified that error appears in the above-identified patent and that said Letters Patent is hereby corrected as shown below:

Column 16,
Line 61, "Transient" should read -- transient --.

Column 19,
Line 66, "claims" should read -- claim --.

Signed and Sealed this

Twenty-third Day of July, 2002

*Attest:*

*Attesting Officer*

JAMES E. ROGAN
*Director of the United States Patent and Trademark Office*